United States Patent [19]

Odashima et al.

[11] Patent Number: 4,891,273
[45] Date of Patent: Jan. 2, 1990

[54] MULTIPLE COATED COMPOSITE STEEL STRIP

[75] Inventors: Hisao Odashima; Yoshihiko Hirano; Teruyoshi Hiraoka, all of Himeji, Japan

[73] Assignee: Nippon Steel Corporation, Tokyo, Japan

[21] Appl. No.: 193,375

[22] Filed: May 12, 1988

[30] Foreign Application Priority Data

May 18, 1987 [JP] Japan .................... 62-120531

[51] Int. Cl.$^4$ ............................................. B32B 15/04
[52] U.S. Cl. ...................................... 428/623; 428/626; 428/632; 428/667; 428/680
[58] Field of Search ............... 428/623, 626, 632, 667, 428/680

[56] References Cited

U.S. PATENT DOCUMENTS

| | | | |
|---|---|---|---|
| 4,411,964 | 10/1983 | Hara et al. | 428/623 |
| 4,659,394 | 4/1987 | Hara et al. | 428/623 |
| 4,775,600 | 10/1988 | Adaniya et al. | 428/623 |

FOREIGN PATENT DOCUMENTS

| | | |
|---|---|---|
| 0149461 | 7/1985 | European Pat. Off. . |
| 020007 | 11/1986 | European Pat. Off. . |
| 3151115 | 9/1982 | Fed. Rep. of Germany . |
| 61-036587 | 2/1986 | Japan . |

OTHER PUBLICATIONS

Chemical Abstracts, vol. 100, No. 10, p. 248, Col. 2, Abstract No. 72335u, Mar. 5, 1984.

Primary Examiner—L. Dewayne Rutledge
Assistant Examiner—George Wyszomierski
Attorney, Agent, or Firm—Kenyon & Kenyon

[57] ABSTRACT

A multiple coated composite steel strip having an excellent corrosion (rust) resistance, weldability and paint adhesion, and thus useful for car bodies, comprises a steel strip substrate, a first metal coating layer, a second chlorate coating layer formed by an electrolytic chromate treatment method, containing 40 to 120 mg/m$^2$ of chromium and having a content of $Cr_2O_3$ of 45% by weight or more, and a third resinous coating layer comprising a homopolymer or copolymer of acrylic acid, methacrylic acid, acrylic acid ester or methacrylic acid ester and 15% to 40% of colloidal silica particles having a very small size of 1 to 12 m μm.

14 Claims, 10 Drawing Sheets

MULTIPLE COATED COMPOSITE STEEL STRIP

BACKGROUND OF THE INVENTION

1. Field of the Invention

The present invention relates to a multiple coated composite steel strip having an excellent resistance to corrosion and a superior weldability and processability.

More particularly, the present invention relates to a multiple coated composite steel strip having a specific composite coating layer comprising metal plating layer formed on a steel strip substrate, a chromate coating layer formed on the metal plating layer, and an organic resin layer formed on the chromate coating layer and containing very fine colloidal silica particles.

2. Description of the Related Art

Various metal-plated steel strips, for example, electrically zinc-plated steel strips, galvanized steel strips, and various alloy-plated steel strip, are widely used in the manufacture of cars, electric appliances, and building materials.

Under these circumstances, the need for a composite steel strip having a surface coating layer providing an enhanced corrosion resistance is great, and will become greater in the future.

For example, in the home electric appliance industry, steel strips having a high corrosion resistance which can be used without a surface treatment or application of a coating are needed, to enable the manufacturer to omit the above-mentioned surface treatment or coating procedures and thus decrease the cost of producing the electric appliances.

Also, in the automobile manufacturing industry, due to significant changes in environment, cars are now exposed to a more severe corrosive environment, and thus, from the viewpoint of safety, there is a great demand for various surface treated or coated steel strips having a excellent resistance to corrosion due to, for example, rock salt powder sprinkled on roads to prevent icing of the road surface, as practiced in North America and North Europe, or acid rain caused by $SO_2$ gas discharged from chemical plants into the atmosphere.

Various attempts have been made to meet the above-mentioned demands, wherein, in general, an increase of the corrosion resistance of the steel strip was effected by plating the steel strip with zinc.

The electrical zinc-plated or galvanized steel strip exhibits an enhanced corrosion resistance due to a self-sacrificing corrosion effect of the zinc-plating layer, and therefore, the intensity of the corrosion resistance of the zinc-plated steel strip is increased by increasing the amount or thickness of the zinc plating layer. Nevertheless, this increase in the amount of the zinc plating layer produces an undesirable increase in the cost for producing the zinc-plated steel strip, and results in a reduced processability, weldaility, and productivity of the zinc-plated steel strip. Also, it should be noted that, in general, the zinc-plated steel strip exhibits a poor bonding property to paints or lacquers.

To enhance the corrosion resistance of the zinc-plated steel strip, various types of alloy-plated steel strips were produced. The alloys used for plating these steel strips include, Zn-Ni alloys, Zn-Ni-Co alloys, Zn-Ni-Cr alloys, Zn-Fe alloys, Zn-Co alloys, and Zn-Mn alloys. These alloy-plated steel strips exhibited an enhanced corrosion resistance of 3 to 5 times that of the conventional zinc-plated steel strip, but when left in the open air for a long time or repeatedly sprayed with water or a salt solution, formations of red rust or white rust occurred on these conventional alloy-plated steel strips.

In another attempt to enhance the corrosion resistance, the metal-plated steel strip was further subjected to a chromate treatment. This attempt was quite effective but, when exposed to a high humidity, high temperature air atmosphere or to a salt-containing air atmosphere for about 100 to 150 hours, white rust was generated on the chromate-treated steel strip.

In still another attempt to enhance the corrosion resistance, the zinc-plated and chromate-treated steel strip was further coated with various types of resinous coating materials. This type of coated steel strip is known as an easy pre-coated steel strip and has limited use in practice.

For example, Japanese Unexamined Patent Publication Nos. 58-210.190 and 58-210,192 disclose a weldable composite steel strip having a metal plating layer consisting of a single zinc alloy-plating layer or two zinc alloy-plating layers and formed on a steel strip substrate, a chromate coating layer formed on the alloy-plating layer and a resinous paint-coating layer formed on the chromate coating layer and containing a resinous matrix material and electroconductive material, for example, Zn, Al, Sn, Fe, Ni, Co, Cr, and Mn, and exhibiting an enhanced weldability, paint-bonding property, and corrosion resistance.

The resinous paint-coating layer has a thickness of 5 to 15 $\mu$m. The resinous matrix material comprises at least one member selected from synthetic resins, for example, polyacrylic resins, epoxy resins, polyurethane resins, polyvinylchloride resins, polyester resins, polybutadiene resins, alkyd resins, polystyrene resins and phthalic acid resins, and natural resins.

Japanese Unexamined Patent Publication N0. 58-224,174 discloses a process for producing a composite steel strip having enhanced resistances to corrosion and rust, comprising plating a steel strip substrate with a zinc alloy, subjecting the plated steel strip to a coating type chromate treatment, drying the chromate-treated steel strip without washing with water, and then treating the chromate-treated steel strip with a solution of a composite organic silicate resin.

This Japanese publication 174 discloses that, when the amount of the resultant composite organic silicate resin coating layer is controlled to a level of 4.0 g/m² or less, the resultant coated composite steel strip exhibits a satisfactory spot weldability. Also, this publication teaches that the composite organic silicate resin can be prepared by reacting a water-soluble or dispersable polymeric material with a water-dispersable silica in the presence of a silane compound at a temperature of 50° C to 90° C.

Japanese Unexamined Patent Publication No. 59-116,397 discloses a composite steel strip having two electroplated Ni-Zn or Fe-Zn alloy first layers formed on two surfaces of a steel strip substrate, a thin electroplated alloy second layer, for example, an Fe-Zn alloy layer, formed on one of the first layers, and a resinous layer formed in a thickness of 3 to 10 $\mu$m on the other one of the first layers, and comprising a mixture of an epoxy resin or polyester resin and an electroconductive pigment, or an electroconductive pigment-free epoxy resin or polyester resin. The composite steel strip exhibited enhanced resistances to corrosion and to rust. The one surface of the composite steel strip exhibited a high corrosion resistance and a high paint-bonding property and the other surface thereof exhibited an enhanced spot-weldability and workability.

Japanese Examined Patent Publication No. 61-36,587 discloses a process for treating surfaces of a steel strip comprising forming a chromate coating layer on an electroplated zinc layer on a steel strip substrate, coating the electroplated surface with a specific aqueous solution containing a carboxylated polyethylene resin and a colloidal silica, and drying the solution layer. The resultant dried composite steel strip exhibited an enhanced resistance to finger marking, and a higher paint-bonding property, hardness and corrosion resistance.

Japanese Unexamined Patent Publication No. 60-149,786 discloses a method for treating a surface of a metal plated steel strip, similar to that disclosed in Japanese Examined Patent Publication No. 61-36,587, except that the electroplated zinc layer is replaced by an electroplated zinc alloy layer, and the resinous material is replaced by a water-soluble resinous material. This method is effective for further increasing the corrosion resistance and solvent resistance of the composite steel strip.

Japanese Unexamined Patent Publication No. 61-167,545 discloses a paint-coated weldable composite steel strip having a zinc alloy-plating layer formed on a steel strip substrate, a chromate layer formed on the zinc alloy-plating layer, and a paint layer containing zinc powder and at least one member selected from hard metal powder and hard carbide powder. The composite steel strip exhibited an enhanced corrosion resistance and weldability.

The above-mentioned known composite steel strip are known as organic coated composite steel strips and have enhanced corrosion and rust resistances and other improved properties.

However, the above-mentioned types of organic coated composite steel strips do not always have satisfactory corrosion and rust resistances, especially when exposed to severe corrosive circumstances for a long time, or weldability and/or workability (especially continuous press workability and bead-workability).

For example, in the coated composite steel strip disclosed in Japanese Unexamined Patent Publication Nos. 58-210,190, 58-210,192 and 59-116,397, the electroconductive pigment contained in a resinous coating layer causes an undesirably reduced evenness of the electrodeposited paint coating layer surface and an undesirably increased powdering and buildup of the coated composite steel strip when pressed, and thus an undesirably decreased press-workability. Also, in the coated composite steel strip disclosed in Japanese Unexamined Patent Publication No. 59-116,397, even when the resinous coating layer does not contain the electroconductive pigment, the resultant composite steel strip exhibits an unsatisfactory weldability and press-workability (that is, an increased buildup), the surface of the resinous coating layer exhibits an unsatisfactory lubricity and a poor paint coating property, and the paint coating layer formed on the resinous coating layer has an uneven surface.

Further, in the coated composite steel strip disclosed in Japanese Unexamined Patent Publication of 58-224,174, the composite organic silicate resin coating layer sometimes has an uneven thickness. Even if the unevenness of the thickness is very small, the uneven composite organic silicate resin coating layer results in an uneven surface of a paint-coating layer formed thereon.

Furthermore, the coated composite steel strips disclosed in Japanese Examined Patent Publication No. 61-36,587 and in Japanese Unexamined Patent Publication No. 61-167,545 exhibit an unsatisfactory weldability and surface lubricity. Accordingly, when pressed, the composite steel strips sometimes exhibit an increased galling, powdering and buildup, and thus a degraded press-workability. Also, when the paint is electrodeposited, the resultant paint layer has an uneven surface and exhibits a poor lubricity.

As stated above, the coated composite steel strips do not have a satisfactory corrosion and rust resistance and weldability and/or workability, and therefore, are not always usable as rust-resistant steel strips for car bodies.

SUMMARY OF THE INVENTION

An object of the present invention is to provide a multiple coated composite steel strip having a superior resistance to corrosion, an excellent weldability, and a very high workability.

The above-mentioned object can be attained by the multiple coated composite steel strip of the present invention, which comprises (A) a substrate consisting of a steel strip; and (B) at least one composite coating layer formed on at least one surface of the steel strip substrate, and comprising;

(a) a first coating layer formed on the surface of the steel strip substrate and comprising a plated metallic material, (b) a second coating layer formed on the first coating layer and comprising an electrolytically deposited chromate material having a total content of chromium of 40 to 120 mg/m$^2$ and a content of $Cr_2O_3$ of 45% by weight or more; and (c) a third coating layer formed to a thickness of 0.5 to 3.0 $\mu$m on the second coating layer and comprising a polymeric matrix consisting essentially of at least one polymer selected from the group consisting of acrylic acid homopolymers and copolymers, acrylic acid ester homopolymers and copolymers, methacrylic acid homopolymers and copolymers, and methacrylic acid ester homopolymers and copolymers, and 15% to 40% based on the weight of the polymeric matrix, of colloidal silica particle having a size of 1 to 12 m $\mu$m.

Preferably, the acrylic acid copolymer is selected from a copolymer of 70 to 95 molar % of at least one type of olefin having 2 to 6 carbon atoms with the balance consisting of acrylic acid.

DESCRIPTION OF THE PREFERRED EMBODIMENTS

Figure 1A:
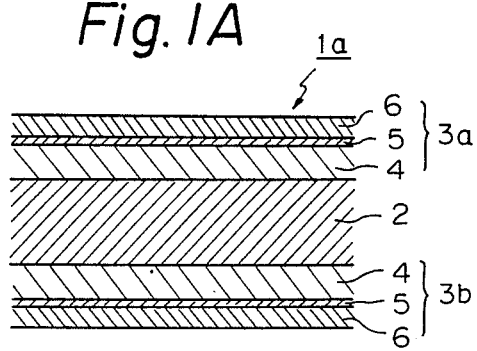
FIGS. 1A, 1B, and 1C are, respectively, explanatory cross-sectional profiles of an embodiment of the multiple coated composite steel strip of the present invention.

The multiple coated composite steel strip of the present invention comprises a substrate consisting of a steel strip and at least one composite coating layer formed on at least one surface of the steel strip substrate. The composite coating layer s formed on both or either one of the two surfaces of the steel strip substrate.

Each composite coating layer comprises a first coating layer formed on the steel strip substrate, a second coating layer formed on the first coating layer, and a third coating layer formed on the second coating layer.

The first coating layer comprises a plated metallic material, for example, Zn, Sn, Cu, Cr, Ni, Mn, Co and Fe and alloys consisting of two or more of the above-mentioned metals. The first coating layer is preferably in an amount of 3 to 150 $g/m^2$, more preferably 5 to 60 $g/m^2$.

The first coating layer of the present invention preferably comprises plated metallic nickel alone, or a nickel-containing alloy, more preferably a zinc-nickel alloy.

The zinc-nickel alloy preferably comprises 80 to 95% by weight of zinc and 5 to 20% by weight or nickel.

In an example of the first coating layer, an underlayer is formed on the steel strip substrate surface and an overlayer is formed on the underlayer, one of the over and under layers comprising a metallic material free from nickel and the other comprising a nickel-containing metallic material.

The second coating layer comprises an electrolytically deposited chromate material having a total content of chromium of 40 to 120 $mg/m^2$, preferably 50 to 90 $mg/m^2$ and a content of $Cr_2O_3$ of 45% by weight or more, preferably 60% by weight or more.

The third coating layer has a thickness of 0.5 to 3.0 $\mu$m, preferably 1.0 to 2.5 $\mu$m, and comprises a polymeric matrix consisting essentially of at least one polymer selected from the group consisting of acrylic acid homopolymers and copolymers, acrylic acid ester homopolymers and copolymers, methacrylic acid homopolymers and copolymers, and methacrylic acid ester homopolymers and copolymers, and 15% to 40%, preferably 15% to 30%, based on the weight of the polymeric matrix, of colloidal silica particles having a size of 1 to 12 m $\mu$m. Preferably, the polymeric matrix in the third resinous coating layer consists essentially of a copolymer of 70 to 95 molar %, more preferably, 70 to 90 molar %, of at least one type of olefin having 2 to 6 carbon atoms with the balance consisting of acrylic acid.

When one surface of the steel strip substrate is coated with the composite coating layer of the present invention, the other surface may not be coated or plated or may be coated with an additional single or composite coating layer different from the above-mentioned composite coating layer.

For example, the other surface of the steel strip substrate may have an additional electrolytically deposited chromate layer formed thereon having a total content of chromium of 6 mg/m$^2$ or less and a content of $Cr_2O_3$ of 45% by weight or more.

In another example, the other surface of the steel strip substrate may have an additional metal plating layer formed thereon in an amount of 3 to 150 g/m$^2$. The metal to be plated may be selected from the same group as that selected for the first metal coating layer. Preferably, the additional metal coating layer consists essentially of nickel alone or a nickel alloy, for example, a nickel-zinc alloy, particularly, an alloy of 5% to 20% by weight of nickel with 80% to 95% by weight of zinc.

In still another example, the additional metal plating layer may comprise an additional underlayer formed on the other surface of the steel strip substrate and an additional overlayer formed on the additional underlayer, one of the additional under and over layers comprising a nickel-containing metallic material and the other comprising a nickel-free metallic material. The nickel-containing metallic material may be selected from nickel and nickel alloys containing at least one member selected from Zn, Sn, Cu, Cr, Co, and Fe, preferably Zn. The nickel free metallic material may be selected from Zn, Sn, Cu, Cr, Co, and Fe and alloys of two or more of the above mentioned metals.

Referring to FIG. 1A, a multiple coated composite steel strip 1a of the present invention comprises a steel strip substrate 2 and two composite coating layers 3a and 3b formed on two surfaces of the substrate 2. Each of the composite coating layers 3a and 3b comprises a first metal coating layer 4, a second chromate coating layer 5, and a third resinous coating layer 6.

Figure 1B:
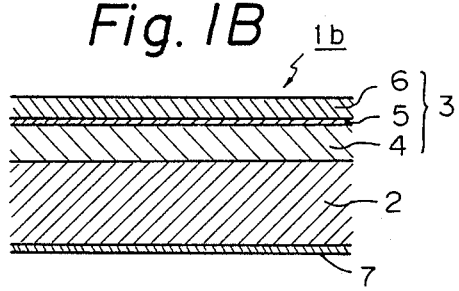

Referring to FIG. 1B, a composite steel strip 1b of the present invention comprises a steel strip substrate 2 and a composite coating layer 3 formed on an upper surface of the substrate 2 and comprising a first metal coating layer 4, a second chromate coating layer 5, and a third resinous coating layer 6, and an additional electrolytically deposited chromatic layer 7 formed on the lower surface of the substrate 2.

Figure 1C:
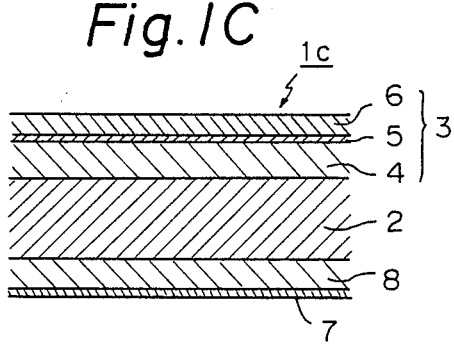

Referring to FIG. 1C, a composite steel strip 1C of the present invention comprises a steel strip substrate 2, a composite coating layer 3 formed on an upper surface of the substrate 2 and comprising a first metal coating layer 4, a second chromate coating layer 5, and a third resinous coating layer 6, an additional metal coating layer 8 formed on a lower surface of the substrate 2, and an additional chromate coating layer 7 formed on the additional metal coating layer 8 by an electrolytical deposition method.

As a result of research by the inventors of the present invention, it was found that the second chromate coating layer to be formed on the first metal coating layer must be formed by an electrolytic deposition, to provide a firm bonding of the second chromate coating layer to the first metal coating layer and a satisfactory mechanical strength thereof. If a chromatic coating method or reactive chromate method is applied to the first metal coating layer, a chromate layer is formed mainly by a substitution reaction between metallic ions eluted from the first metal coating layer and the coating material applied to the first metal coating layer. Therefore, this resultant chromate layer usually has a relatively low mechanical strength and cannot resist severe working. For example, when this type of chromate layer is coated with a resinous material and the resultant composite steel strip is pressed, if the intensity of the pressing is relatively low, the composite steel strip can be pressed without breakage of the chromate layer, but if the pressing is carried out under severe conditions, the chromate layer is broken, and thus the resinous coating layer will peel from the steel strip.

In the electrolytical chromate treatment, the chromate layer is formed mainly by a deposition of ions in the chromate treating liquid, and thus has a high density and mechanical strength and is firmly bonded to the first metal coating layer.

Accordingly, the composite steel strip of the present invention having the second electrolytically deposited chromate coating layer can be processed under severe conditions without breakage of the chromate layer.

The inventors of the present invention also found that the content of $Cr_2O_3$ in the second chromate coating layer must be 45% or more, based on the total weight of the second chromatic coating layer. That is, the second chromate coating layer can contain, in addition to $Cr_2O_3$, metallic chromium, chromium hydroxide, and other chromium compounds. The above-mentioned specific content of $Cr_2O_3$ effectively enhances the bonding strength of the second chromate coating layer to the third resinous coating layer and the corrosion resistance of the resultant composite steel strip. Also, the aforementioned specific total amount of chromium in the second chromate coating layer effectively increases the bonding strength of the second chromate coating layer to the third resinous coating layer and the corrosion resistance of the resultant composite steel strip.

The content of $Cr_2O_3$ in the second chromate coating layer can be determined in such a manner that X-rays or electron beams are applied to the second chromate coating layer while successively removing the second chromate coating layer, the binding energy of each component in the layer is measured and integrated, and the amount of $Cr_2O_3$ is determined from the integrated result by wave form separation.

Figure 2:
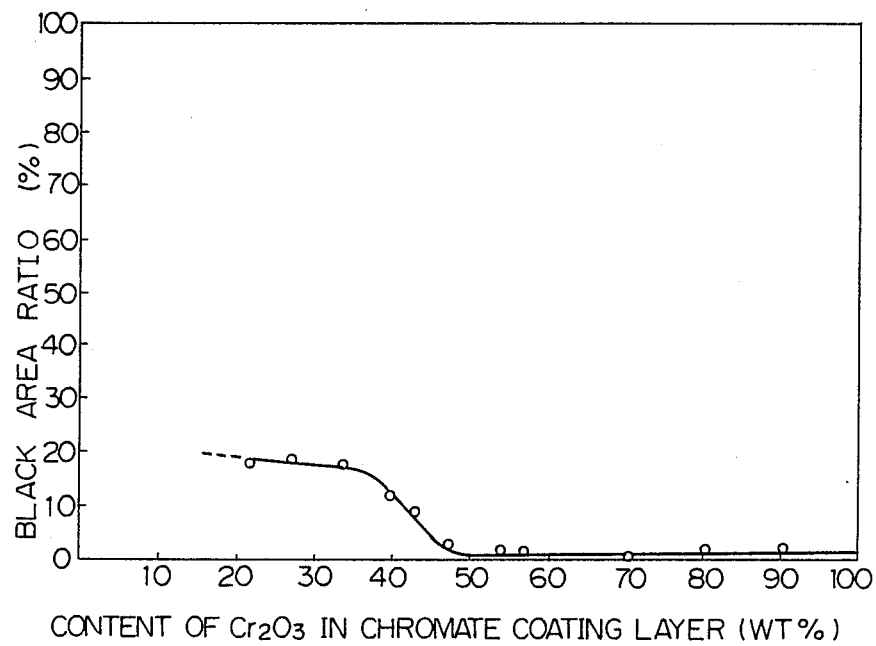
FIG. 2 is a graph showing a relationship between a content of $Cr_2O_3$ in an electrolytically deposited chromate layer in a multi coated composite steel strip and a block area ratio (degree of peeling property) of a composite coating layer of the composite steel strip.

FIG. 2 shows a relationship between the content of $Cr_2O_3$ in the second chromate coating layer of a composite steel strip and the black area ratio (peeling resistance) of the composite coating layer of the composite steel strip. The composite steel strip was prepared in such a manner that a first metal coating layer consisting of a zinc-nickel alloy was formed on a surface of a steel strip substrate, a second chromate coating layer was formed in the content of $Cr_2O_3$ as indicated in FIG. 2 and in a total content of chromium of 70 mg/m$^2$ on the first metal coating layer, and then a third resinous coating layer was formed in a thickness of 1.5 μm on the second chromate coating layer by applying an aqueous dispersion containing a copolymer of 80 molar % of ethylene with 20 molar % of acrylic acid and 20%, based on the weight of the copolymer, of colloidal silica particles having a size of 5 to 7m μm, to the second chromate coating layer surface, and by drying the aqueous solution dispersion layer on the second chromate coating layer.

Figure 3:
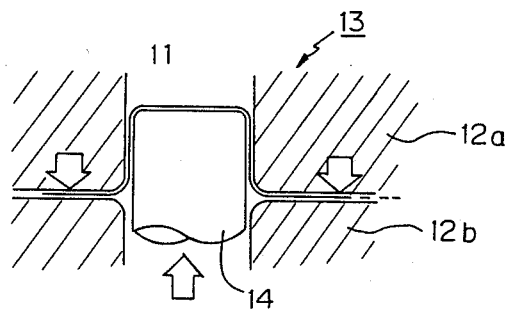
FIG. 3 is an explanatory cross-sectional view of a cylindrical deep drawing apparatus for preparing a specimen for the corrosion test of the deep drawn composite steel strip.

The peeling test for the composite steel strip was carried out by using the testing apparatus as shown in FIG. 3.

Referring to FIG. 3, a blank 11 consisting of a composite steel strip was fixed between a pair of pressing plates 12a and 12b in a drawing dice 13 under a pressure of 10 tons and was drawn by a punch 14 having a diameter of 50 mm at a depth of 35 mm. The blank had a diameter of 90 mm and the dice had a surface roughness of 120.

The black area ratio was determined by fixing an adhesive tape to the deformed portion of the specimen, peeling the adhesive tape from the specimen, measuring the black area of the adhesive tape, and calculating a ratio of the black area to the entire area of the adhesive tape. The larger the black area ratio, the larger the area of the peeled portions of the composite coating layer, and thus the lower the peeling resistance of the composite coating layer.

FIG. 2 clearly indicates that, when the content of $Cr_2O_3$ in the second chromate coating layer is 45% by weight or more, the resultant composite steel strip exhibits a satisfactory peeling resistance.

Figure 4:
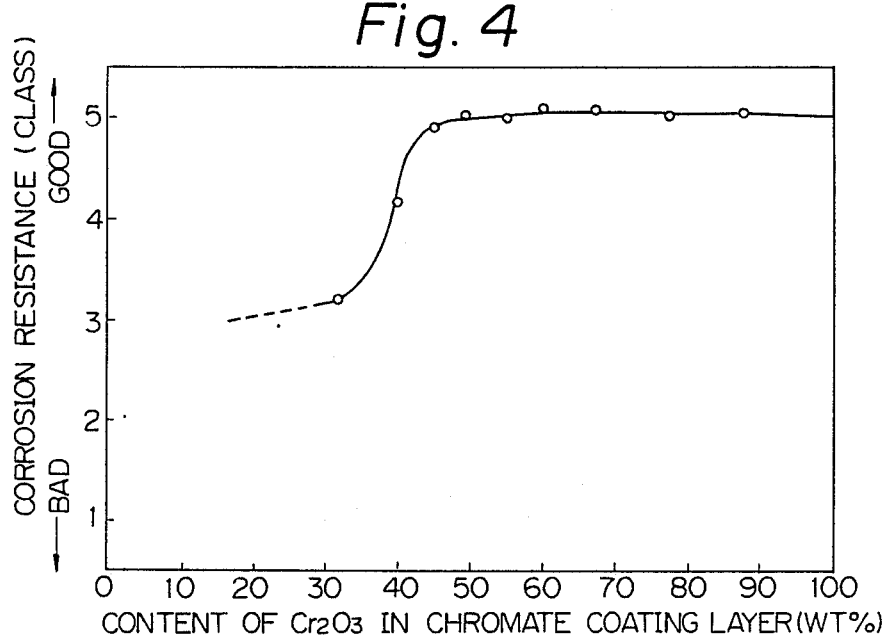
FIG. 4 is a graph showing a relationship between a content of $Cr_2O_3$ in an electrolytically deposited chromate coating layer in a multi coated composite steel strip and a degree of flat plate corrosion resistance of the composite steel strip.

FIG. 4 shows a relationship between the content of $Cr_2O_3$ in the second chromate coating layer of the same composite steel strip as mentioned in FIG. 2 and the corrosion resistance of the composite steel strip.

The corrosion resistance of the composite steel strip was determined by a salt-solution spray test in accordance with Japanese Industrial Standard (JIS) Z 2371. In this test, an aqueous solution of 5% by weight of sodium chloride was sprayed on a specimen at 35° C. under a spraying pressure of 20 psi for 4000 hours. A ratio of rusted area to the entire area of the coating surface of the specimen was determined and was classified into 5 classes, as follows:

| Class | Ratio of rusted area to entire area |
|---|---|
| 5 | 0% |
| 4 | less than 1% |
| 3 | 1% to 10% |
| 2 | more than 10% and 50% or less |
| 1 | more than 50% |

FIG. 4 clearly shows that, when the content of $Cr_2O_3$ in the second chromate coating layer is 45% or more, the resultant composite steel strip exhibits an excellent resistance to rust and corrosion.

Figure 5:
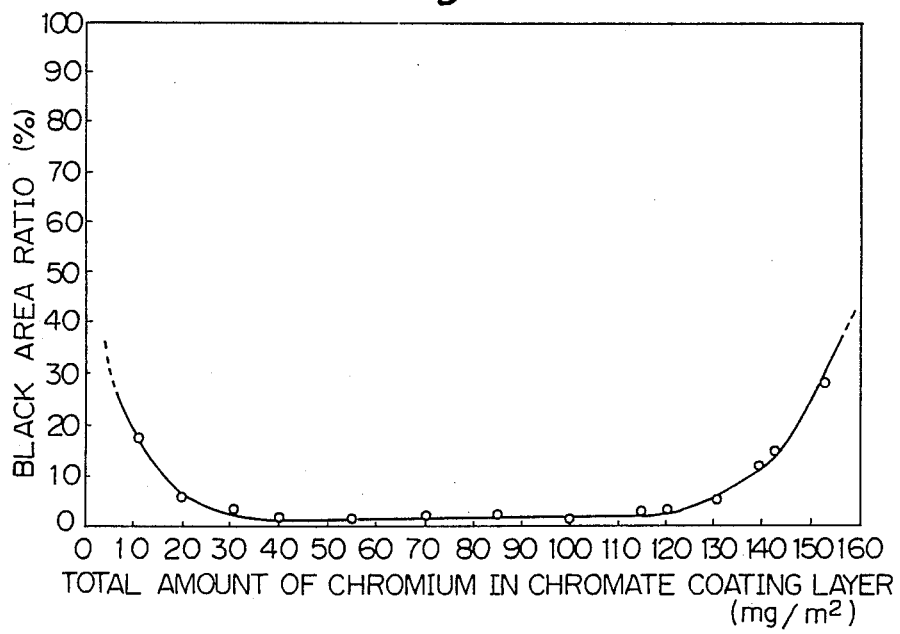
FIG. 5 is a graph showing a relationship between a total amount of chromium in a chromate coating layer and a black area ratio (degree of peeling property) of a composite steel strip.

FIG. 5 shows a relationship between the total amount of chromium in the second chromate coating layer of a composite steel strip and the black area ratio (peeling resistance) of the composite coating layer of the composite steel strip. The composite steel strip was produced by electroplating a surface of a steel strip substrate with a zinc-nickel alloy, by treating the first Zn-Ni alloy coating layer surface with a chromate treating liquid to provide a second chromate coating layer having a content of $Cr_2O_3$ of 90% by weight and the total content of chromium as shown in FIG. 5, and in a dry thickness of 1.5 μm, and by coating the second chromate coating layer surface in the same manner as mentioned in FIG. 2.

FIG. 5 clearly shows that, when the total content of chromium in the second chromatic coating layer is in the range of from 40 to 120 mg/m², the resultant composite steel strip exhibits an excellent peeling resistance.

Figure 6:
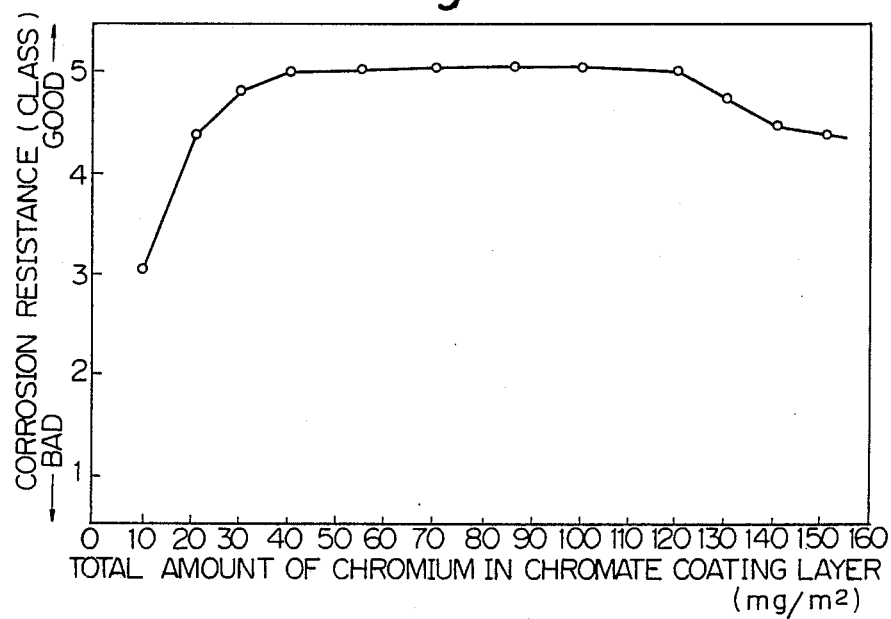
FIG. 6 is a graph showing a relationship between a total amount of chromium in a chromate coating layer and a flat plate corrosion resistance of a composite steel strip.

FIG. 6 shows a relationship between the total content of chromium in the second chromate coating layer of the same composite steel strips as mentioned in FIG. 5, and the corrosion and rust resistance of the composite steel strip. In view of FIG. 6, it is clear that, when the total content of chromium in the second chromate coating layer is in the range of from 40 to 120 mg/m², the resultant composite steel strip exhibits an excellent corrosion and rust resistance.

The second chromate coating layer having a content of $Cr_2O_3$ of 45% by weight or more, and a total content of chromium of 40 to 120 mg/m², can be produced by the electrolytic deposition method, using, for example, a treating liquid containing $Cr_2O_3$, heavy metal ions, and halogen ions. This chromate treating method is concretely disclosed by Japanese Examined Patent Publication No. 49-14,457. Japanese Unexamined Patent Publication Nos. 58-210,190 and 58-210,192 also disclose the electrolytic deposition method for chromate. Nevertheless, the above-mentioned Japanese publications do not disclose the specific content of $Cr_2O_3$ and the specific total content of chromium in the second chromate coating layer, and the relationships between the composition of the second chromate coating layer and the bonding strength of the second chromate coating layer to the third resinous coating layer and the corrosion and rust resistance of the resistant composite steel strip.

In the composite steel strip of the present invention, the first metal coating layer to be arranged under the second chromate coating layer preferably contains nickel. Namely, the inventors of the present invention found that, when the first metal coating layer contains nickel, the resultant second chromate coating layer has a high density and a high chemical stability.

Figure 7:
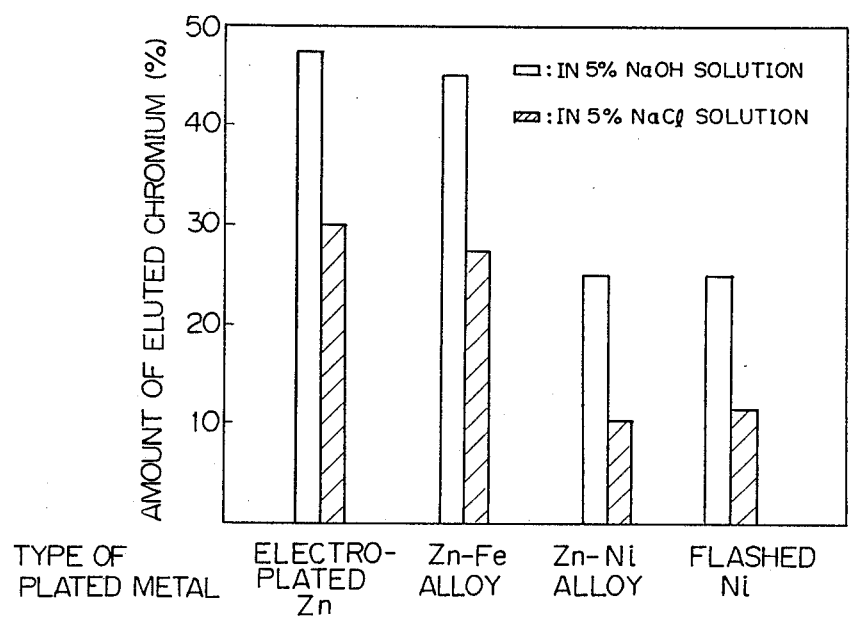
FIG. 7 is a graph showing amounts of chromium eluted from an zinc-electroplated steel strip, a zinc-iron alloy-plated steel strip, a zinc-nickel alloy-plated steel strip and a nickel flushed steel strip, each having been treated with chromate by a conventional method, when treated with a 5% NaOH solution and with a 5% NaCl solution at room temperature for 44 hours, respectively.

FIG. 7 shows that, when treated with a 5% NaOH aqueous solution or a 5% NaCl aqueous solution at room temperature for 44 hours, the composite steel strip having a first metal coating layer consisting of a plated Zn-Ni alloy or a flashed nickel exhibited a smaller amount of chromium eluted therefrom than that of another composite steel strip having a first metal coating layer consisting of an electroplated zinc or a plated zinc-iron alloy. In each composite steel strip, the chromate coating layer was formed by a conventional $CrO_3$-$SO_4^{--}$ type chromate treatment method and had a content of $Cr_2O_3$ of about 40% by weight.

FIG. 7 clearly shows that the presence of nickel in the first metal coating layer effectively chemically stabilizes the resultant chromate coating layer and decreases the amount of chromium eluted from the chromate coating layer into the NaOH or NaCl solution.

Figure 8:
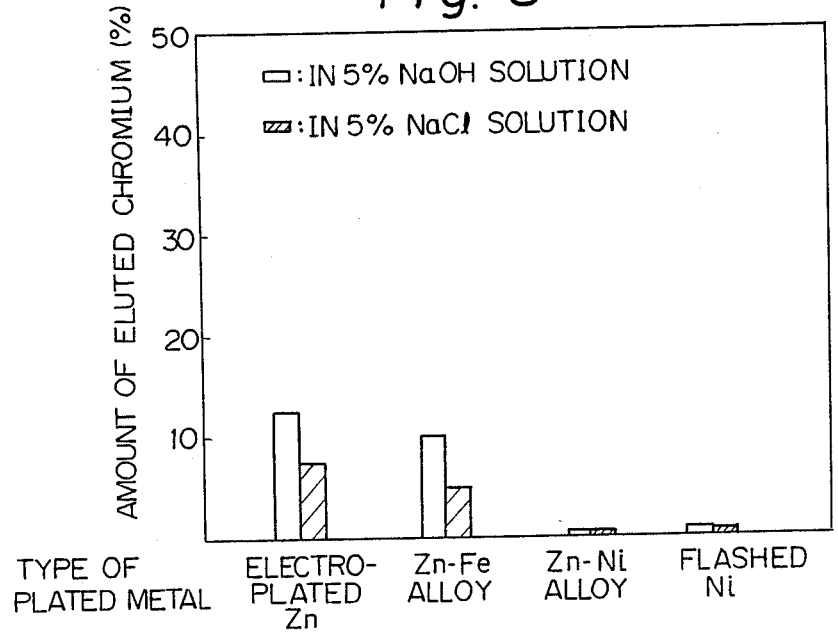
FIG. 8 is a graph showing amounts of chromium eluted from an zinc-electroplated steel strip, a zinc-iron alloy-plated steel strip, a zinc-nickel alloy-plated steel strip, and a thin nickel-flushed steel strip, each having been treated with chromate in accordance with the present invention, when treated with a 5% NaOH solution and with a 5% NaCl solution at room temperature for 44 hours, respectively.

FIG. 8 shows the amounts of chromium eluted from composite steel strips having metal coating layers consisting of electroplated zinc, plated zinc-iron alloy, plated zinc-nickel alloy, and flashed nickel, when treated with a 5% NaOH aqueous solution or a 5% NaCl aqueous solution at room temperature for 44 hours. The chromate coating layer in each composite steel strip was prepared by the above-mentioned electrolytic deposition method using a $CrO_3$-heavy metal ion-halogen ion type chromate treatment solution, and contained about 80% by weight of $Cr_2O_3$.

FIG. 8 shows that the chromate coating layers formed on nickel-containing metal coating layers exhibited a very small amount of chromium eluted therefrom and were very chemically stable, whereas the chromate coating layers formed on nickel-free metal coating layers exhibited a relatively large amount of chromium eluted therefrom.

From a comparison of FIG. 7 and FIG. 8, it is clear that, when the chromate coating layer is prepared by the $CrO_3$-heavy ion-halogen ion method and contains 45% by weight of $Cr_2O_3$ and 40 to 120 mg/m² of chromium, as shown in FIG. 8, the resultant chromate coating layer has a significantly higher chemical stability than the chromate coating layer containing less than 45% by weight of $Cr_2O_3$, as shown in FIG. 7.

Figure 9:
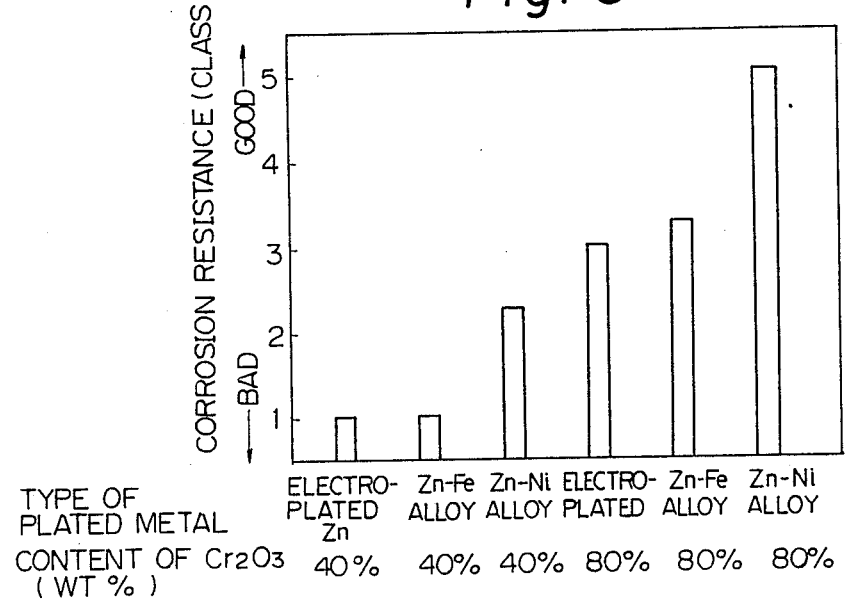
FIG. 9 is a graph showing the corrosion resistance of a zinc-electroplated steel strip, a zinc-iron alloy-plated steel strip, and a zinc-nickel alloy-plated steel strip having a content of $Cr_2O_3$ of 40% by weight or 80% by weight in the chromate coating layers thereof.

FIG. 9 shows the corrosion resistance of six composite steel strips each having the type of metal coating layer and chromate coating layer indicated in FIG. 9.

The chromate coating layers containing 40% by weight of $Cr_2O_3$ were prepared by using a conventional CrO-S04 ion type chromate treatment liquid. The other chromate coating layers containing 80% of weight of $Cr_2O_3$ were prepared by using a $CrO_3$-heavy metal ion-halogen ion type electrolytic chromate treating liquid.

The corrosion test and the evaluation of the test results were carried out in the same manner as mentioned in FIG. 4, except that the spraying of the salt solution was continuously carried out for 600 hours.

FIG. 9 clearly shows that the chromate coating layers containing 45% or more of $Cr_2O_3$ cause the resultant composite steel strips to exhibit a higher corrosion resistance than those having a content of $Cr_2O_3$ of less than 45% of weight in the chromate coating layer.

Namely, the content of $Cr_2O_3$ of 45% by weight or more provides a high density and a high chemical stability of the chromate coating layer.

Also, FIG. 9 indicates that the metal coating layer is formed by a nickel-containing metal material, the resultant composite steel strip exhibits an enhanced corrosion (rust) resistance. The nickel-containing metal layer may consist of a flashed nickel or a nickel-containing alloy, for example, a Zn-Ni alloy.

In the multiple coated composite steel strip of the present invention, the second chromate coating layer is coated by a third resinous coating layer.

The third resinous coating layer has a thickness of 0.5 to 3.0 μm and comprises a polymeric matrix and a dispersoid consisting of colloidal silica particles dispersed in the polymeric matrix and having a size of 1 to 12 m μm. The polymeric matrix consist essentially of at least one member selected from acrylic acid homopolymer and copolymers, acrylic acid ester homopolymers and copolymers, methacrylic acid homopolymers and copolymers, and methacrylic acid esters homopolymers and copolymers.

The acrylic acid ester usable for the acrylic acid ester homopolymers and copolymers is preferably selected from methyl acrylate, ethyl acrylate, n-butyl acrylate, isobulyl acrylate, propyl acrylate, cyclopropyl acrylate and neopentyl acrylate.

The methacrylic acid ester usable for the methacrylic acid ester homopolymers and copolymers is preferably selected from methyl methacrylate, ethyl methacrylate, n-butyl methacrylate, isobutyl methacrylate, propyl methacrylate, cyclopyropyl methacrylate and neopentyl methacrylate.

In the acrylic acid copolymers, the content of acrylic acid is preferably 5 molar % or more. The additional monomer to be copolymerized with acrylic acid is preferably selected from olefines having 1 to 6 carbon atoms, for example, ethylene, propylene, 1-butene, 1-pentene, isobutylene, dimethylethylene, diethylethylene, isobutene, cis-2-butene and trans-2-butene.

The preferable acrylic acid copolymer is a copolymer of 70 to 95 molar % of at least one olefin having 2 to 6 carbon atoms with the balance consisting of acrylic acid.

In the acrylic acid ester copolymers, the content of acrylic acid ester is preferably 5 molar % or more.

In the methacrylic acid copolymers, the content of methacrylic acid is preferably 5 molar %.

In the methacrylic acid ester copolymers, the content of methacrylic acid ester is preferably 5 molar % or more.

The acrylic acid ester, methacrylic acid, or methacrylic acid ester is copolymerized with at least one additional monomer which is preferably selected from, for example, styrene, aminostyrene, methylstyrene, maleic acid, methacrylic acid, acrylamide, dihydroxyethyl acrylate, isopropyl methacrylate, ethyl acrylate, 2-ethylhexyl acrylate, butyl methacrylate, hexyl methacrylate, methoxypolyethyleneglycol acrylate, vinyl acetate, vinyl propionate, vinyl benzoate, vinyl oleate, vinyl sulfonate, and crotonic acid.

In the preparation of the third resinous coating layer, the polymer material for the polymeric matrix is dissolved or dispersed in water. Also, the colloidal silica particles are dispersed in the polymer-containing aqueous liquid. The resultant aqueous liquid is coated on the second chromate coating layer by a usual coating method, for example, spraying, roll coating or dipping, and the aqueous liquid layer is dried to form a third resinous coating layer having a thickness of 0.5 to 3.0 μm.

The third resinous coating layer of the present invention effectively enhances the paint adhesion (paint-bonding strength) of the resultant composite steel strip.

Figure 10:
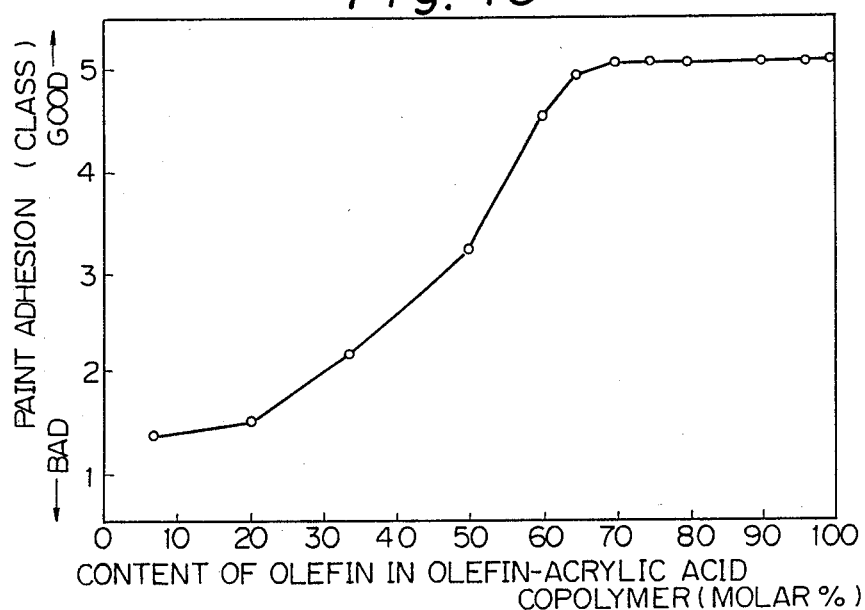
FIG. 10 is a graph showing a relationship between a content of olefin in an olefin-acrylic acid copolymer in a resinous coating layer of a composite steel strip and a paint adhesion property thereof.

FIG. 10 shows a relationship between the content of copolymerized olefin (ethylene) in an olefin-acrylic acid copolymer in a third resinous coating layer of a composite steel strip, and the paint adhesion thereof.

The composite steel strip was produced in such a manner that a surface of a steel strip substrate was electroplated with a Zn-Ni alloy; the resultant first metal coating layer was coated with a second chromate coating layer having a content of $Cr_2O_3$ of 90% by weight and a total content of chromium of 70 gm/m²; the second chromate coating layer was coated with an aqueous dispersion containing an olefin (ethylene)-acrylic acid copolymer in which the content of copolymerized olefin was as indicated in FIG. 10, and 20%, based on the dry weight of the copolymer, of colloidal silica particles having a size of 5 to 7 m μm; and then the aqueous dispersion layer was dried to form a third resinous coating layer having a thickness of 1.5 μm. In the painting test, the surface of the third resinous coating layer was coated three times with a usual cationic paint by an electrodeposition method to form an under paint layer having a thickness of 20 μm, and intermediate and over paint layers each having a thickness of 30 μm.

The paint-coated specimen was immersed in distilled water at 50° C. for 10 days, and then was subjected to a cross-cut test by cuts made at intervals of 2 mm. An adhesive tape was fixed to the cross-cut surface of the specimen and was peeled from the surface, and the ratio of an area of portions of the surface from which the paint layer was peeled to the entire area of the tested surface was measured. The paint adhesion of the composite steel strip was evaluated in the following 5 classes.

| Class | Paint-peeled area ratio |
|---|---|
| 5 | 0% |
| 4 | 1% or less |
| 3 | more than 1% and less than 10% |
| 2 | 10% to 50% |
| 1 | more than 50% |

FIG. 10 indicates that the matrix acrylic acid copolymer preferably contains olefin in a content of 70 molar % or more, as the resultant third resinous coating layer exhibits an excellent paint adhesion.

Figure 11:
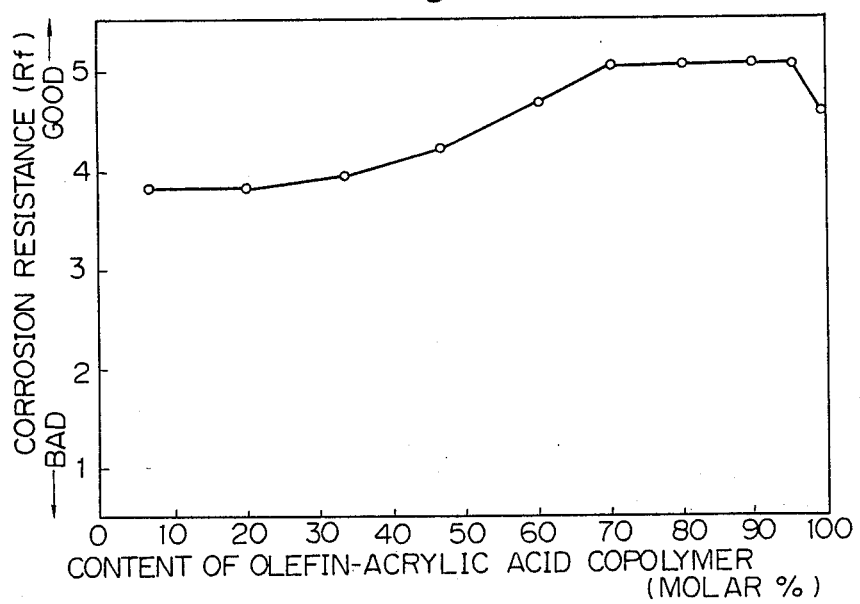
FIG. 11 is a graph showing a relationship between a content of olefin in a olefin-acrylic acid copolymer in a resinous coating layer in a composite steel strip and a corrosion resistance thereof.

FIG. 11 shows the relationship between the content of olefin in the olefin-acrylic acid copolymer matrix in the third resinous coating layer of the composite steel strip as shown in FIG. 10 and the corrosion resistance of the strip.

The corrosion resistance was tested in accordance with JIS Z 2371 as mentioned above.

FIG. 11 clearly indicates that the olefin-acrylic acid copolymer for the polymeric matrix in the third resinous coating layer preferably contains the olefin component in a content of from 70 to 95 molar %, because the resultant composite steel strip exhibits an enhanced corrosion resistance.

Accordingly, when an olefin-acrylic acid copolymer is used, the content of the olefin component is preferably in the range of from 70 to 95 molar %.

The third resinous coating layer contains colloidal silica particles dispersed in an amount of 15 to 40% based on the weight of the polymeric matrix therein and having a very small size of 1 to 12 m $\mu$m.

Japanese Examined Patent Publication No. 61-35,587 and Japanese Unexamined Patent Publication No. 60-149,786 disclose a resinous coating layer formed on a steel strip substrate and containing colloidal silica. These Japanese publications disclose that the colloidal silica effectively increases the hardness of the resinous coating layer.

Nevertheless, in the present invention, it was discovered that the specific colloidal silica particles having a very small size of 1 to 12 m $\mu$m and dispersed in the polymeric matrix effectively and significantly increase the lubricity of the resultant resinous coating layer. Especially, when the specific colloidal silica particles are dispersed in a polymeric matrix consisting of an olefin-acrylic acid copolymer in which the content of olefin is in a specific range, the resultant resinous coating layer exhibits an extremely enhanced lubricity.

Figure 12:
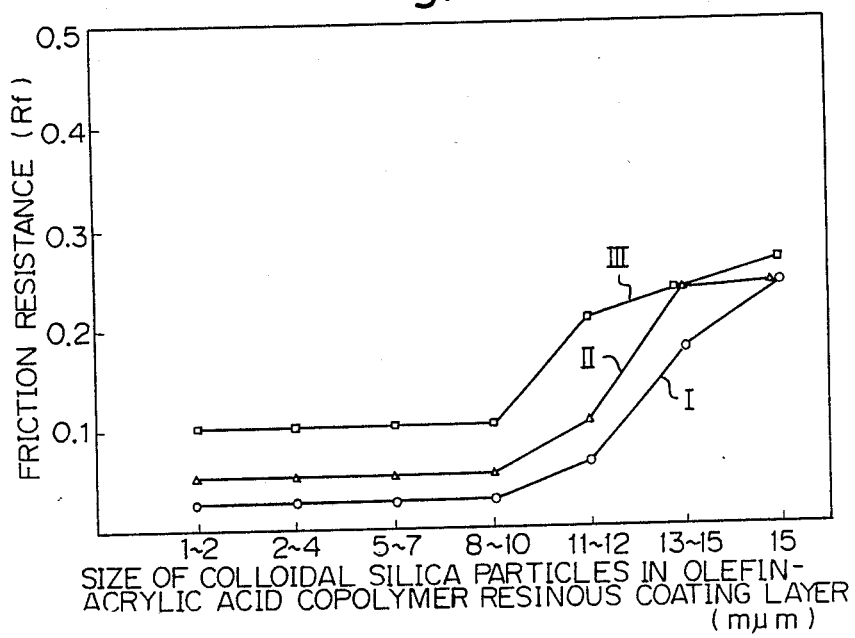
FIG. 12 is a graph showing a relationship between a size of colloidal silica particles in an olefin-acrylic acid copolymer resinous coating layer of a composite steel strip, in which copolymer the content of olefin is 70 to 95 molar % (curve I), 95 to 100 molar % (curve II) or 70 molar % or less (curve III), and a friction resistance thereof.

FIG. 12 shows a relationship between the size of colloidal silica particles dispersed in a polymeric matrix consisting essentially of an olefin-acrylic acid copolymer containing 70 to 95 molar % of an olefin (ethylene) (curve I), another olefin-acrylic acid copolymer containing 95 to 100 molar % of olefin (curve II) or still another olefin-acrylic acid copolymer containing less than 70 molar % of olefin (curve III), in a resinous coating layer of a composite steel strip, and the friction resistance (lubricity) of the resinous coating layer. The composite steel strip was produced in such a manner that a surface of a steel strip substrate was plated with a Zn-Ni alloy, the resultant metal coating layer was electrolytically treated with a chromate treatment liquid to form a chromate coating layer having a total content of chromium of 70 mg/m² and a content of $Cr_2O_3$ of 90% by weight, the chromate coating layer was coated with an aqueous dispersion containing a polymeric matrix consisting of the above-mentioned olefin-acrylic acid copolymer and 20%, based on the weight of the polymeric matrix, of colloidal silica particles having the size as shown in FIG. 12, and the aqueous dispersion layer was dried to provide an resinous coating layer having a thickness of 1.5 $\mu$m.

FIG. 12 indicates that, when the size of the colloidal silica particles is in the range of 1 to 12 m $\mu$m, the resultant resinous coating layer exhibits a decreased friction resistance (an increased lubricity). Also, FIG. 12 indicates that, when the olefin-acrylic acid copolymer has a content of the olefin component of 70 to 95 molar %, the resultant resinous coating layer exhibits a decreased friction resistance.

Figure 13:
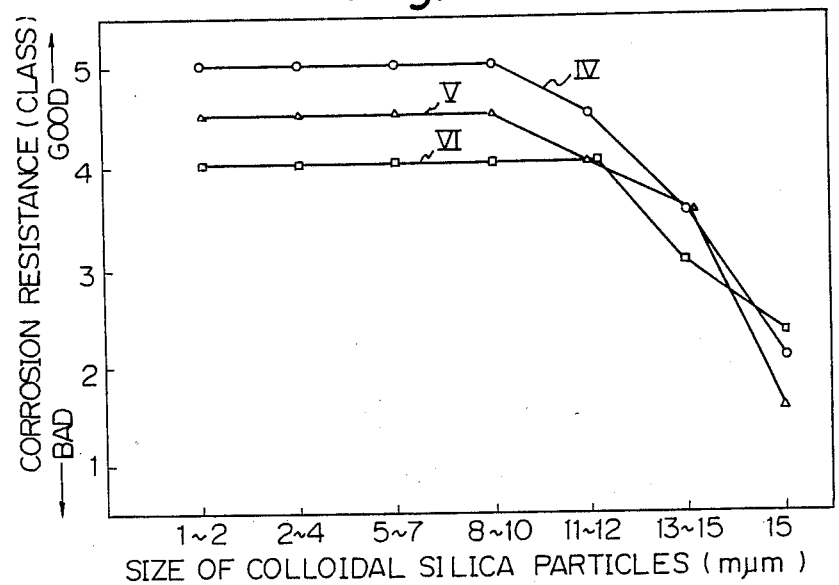
FIG. 13 is a graph showing a size of colloidal silica particles in an olefin-acrylic acid copolymer resinous coating layer of a composite steel strip, in which copolymer the content of olefin is 70 to 95 molar % (curve IV), 95 to 100 molar % (curve V), or 70 molar % or less (curve VI), and a corrosion resistance thereof.

FIG. 13 shows the relationship between the size of the colloidal silica particles dispersed in the same types of copolymers as those in FIG. 12, and the corrosion resistance of the resultant composite steel strips.

FIG. 13 clearly indicates that, when the size of the colloidal silica particles is in the range of from 1 to 12 m $\mu$m, the resultant composite steel strips exhibit an increased corrosion resistance. Also, FIG. 13 indicates that, when the olefin-acrylic acid copolymer has an olefin content of from 70 to 95 molar %, ad the colloidal silica particle size is in the range of from 1 to 12 m $\mu$m, the resultant composite steel strip exhibits a superior corrosion resistance.

Figure 14:
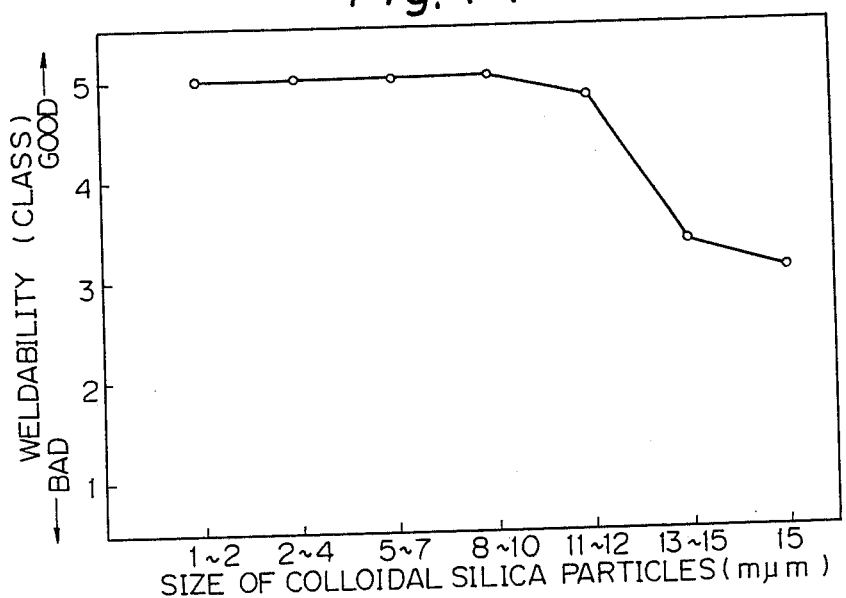
FIG. 14 is a graph showing a relationship between the size of colloidal silica particles in a resinous coating layer of a composite steel strip and the weldability of the strip.

FIG. 14 shows the relationship between the size of the colloidal silica particles in an olefin-acrylic acid copolymer matrix having a content of olefin of 80 molar % in a composite steel strip and the weldability (continuous dotting weldability) of the composite steel strip.

The weldability was tested by a continuous weld and was evaluated by the number of continuous dots until the diameter of the nugget became 4 mm, in to the following five classes.

| Class | Continuous dot number |
| --- | --- |
| 5 | >5000 |
| 4 | 4500 to 5000 |
| 3 | 4000 to 4499 |
| 2 | 3500 to 3999 |
| 1 | <3500 |

FIG. 14 clearly indicates that, when the colloidal silica particle size is in the range of from 1 to 12 m $\mu$m, the resultant composite steel strip exhibits an excellent weldability.

FIG. 55 shows a relationship between the content of the colloidal silica particles in the resinous coating layer of a composite steel strip and the friction resistance (lubricity) of the composite steel strip.

Figure 15:
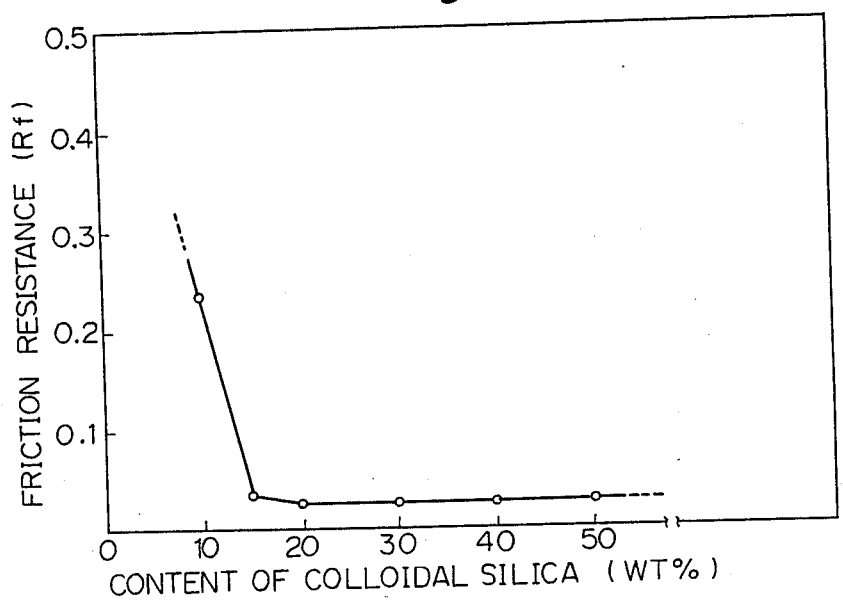
FIG. 15 is a graph showing a relationship between the content of colloidal silica particles in a resinous coating layer of a composite steel strip and a friction resistance of the strip.

The composite steel strip was prepared by coating a surface of a steel strip substrate with a Zn-Ni alloy, by electrolytically depositing a chromate coating layer having a content of $Cr_2O_3$ of 90% by weight and a total content of chromium of 70 mg/m² on the metal coating layer, and by coating the chromate coating layer with a resinous coating layer having a thickness of 1.5 $\mu$m and comprising an olefin-acrylic acid copolymer having a content of olefin (ethylene) of 80 molar % and colloidal silica particles having a size of from 5 to 7 m $\mu$m in the content as shown in FIG. 15.

FIG. 15 clearly shows that, when the content of the colloidal silica particles is 15%, based on the weight of the polymeric matrix, or more, the resultant resinous coating layer exhibits a significantly reduced friction resistance.

Note, when the content of the colloidal silica particles is more than 40%, based on the weight of the polymeric matrix, the resultant resinous coating layer exhibits an undesirable large buildup of colloidal silica particles when the composite steel strip is continuously pressed.

Figure 16:
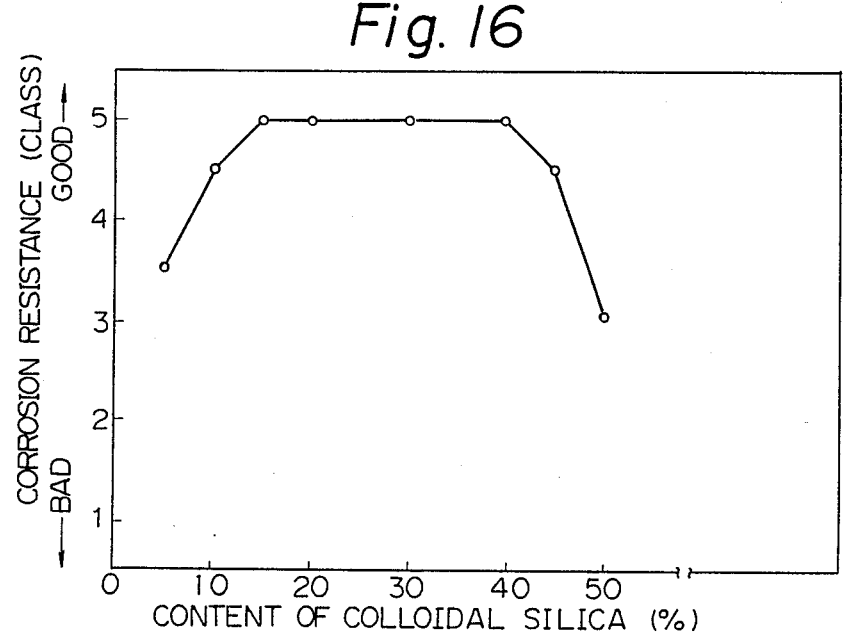
FIG. 16 is a graph showing a relationship between the content of colloidal silica in a resinous coating layer of a composite steel strip and the corrosion resistance of the strip.

FIG. 16 shows a relationship between the content of the colloidal silica particles in the resinous coating layer of the composite steel strip as described in FIG. 16, and the corrosion resistance of the strip. In view of FIG. 16, it is clear that, when the content of the colloidal silica particles is in the range of from 15% to 40% based on the weight of the polymeric matrix, the resultant composite steel strip exhibits an enhanced corrosion resistance.

Throughout FIGS. 12 to 16 it is shown that the colloidal silica particles to be dispersed in the polymeric matrix of the third resinous coating layer of the present invention must have a very small size of from 1 to 12 m μm, and must be used in a content of from 15% to 40% based on the weight of the polymeric matrix.

Figure 17:
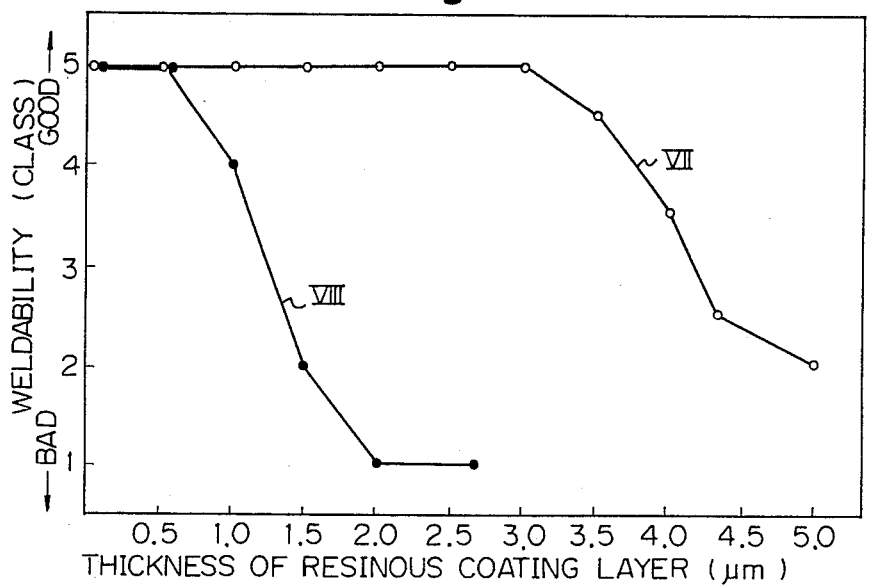
FIG. 17 is a graph showing a relationship between a thickness of a third resinous coating layer of the present invention (curve VII) or of a conventional resinous coating layer (curve VIII) of a composite steel strip and the weldability of the strip.

FIG. 17 shows a relationship between the thickness of the resinous coating layer of the present invention comprising a polymeric matrix consisting of an olefin-acrylic acid copolymer having a content of olefin (ethylene) of 80 molar % and 20%, based on the weight of the polymeric matrix, of colloidal silica particles having a size of 5 to 7 m μm, and the weldability of the resultant composite steel strip.

The composite steel strip had a metal coating layer consisting of a electroplated Zn-Ni alloy and a chromate coating layer having a total content of chromium of 70 $mg/m^2$ and a content of $Cr_2O_3$ of 80% of weight.

FIG. 17 also shows a relationship between the thickness of conventional resinous coating layer consisting of a polyurethane resin and the weldability of the resultant composite steel strip.

As shown in FIG. 17, an increase in the thickness of the conventional resinous coating layer to more than 0.5 μm results in a decrease in the weldability of the resultant composite steel strip. Accordingly, the conventional resinous coating layer should have a very small thickness of 0.5 μm or less, to obtain a satisfactory weldability of the composite steel strip. This very small thickness, however, will cause a reduced corrosion resistance of the resultant composite steel strip.

Referring to FIG. 17, even when the resinous coating layer of the present invention has a relatively large thickness of 3.0 μm or less, the resultant composite steel strip exhibits an excellent weldability. This relatively large thickness of the resinous coating layer will result in an enhanced corrosion resistance of the composite steel strip.

Figure 18:
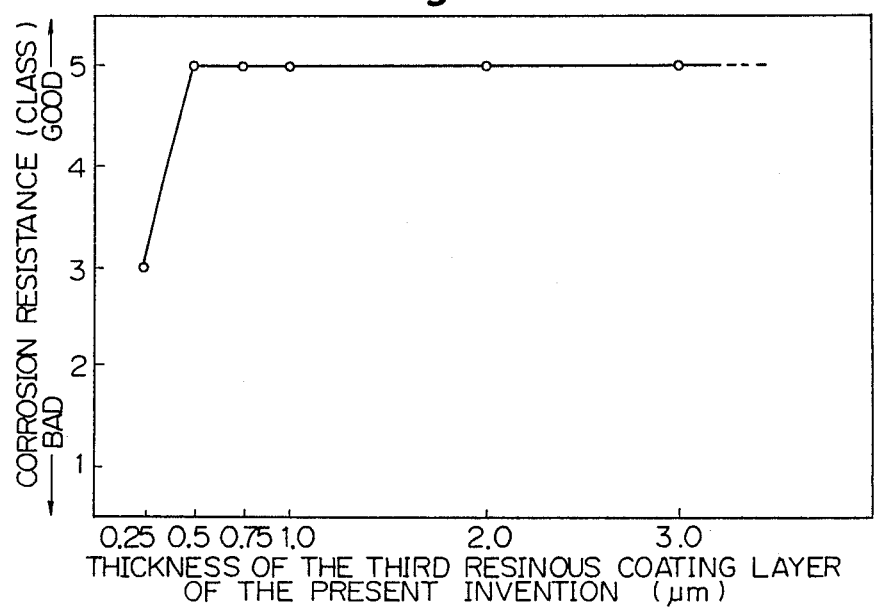
FIG. 18 is a graph showing a relationship between a thickness of the third resinous coating layer of a composite steel strip of the present invention and the corrosion resistance of the strip.

FIG. 18 shows a relationship between the thickness of the third resinous coating layer of the present invention and the corrosion resistance of the resultant composite steel strip.

As can be seen from FIG. 18, the thickness of the resinous coating layer in the range of from 0.5 to 3.0 μm clearly results in a excellent corrosion resistance of the resultant composite steel strip.

Referring to FIGS. 1B and 1C, the additional chromate coating layer 7 on the lower surface side of the steel strip substrate 2 preferably has a total amount of chromium of 6 $mg/m^2$ or less, more preferably 3 $mg/m^2$ or less.

Figure 19:
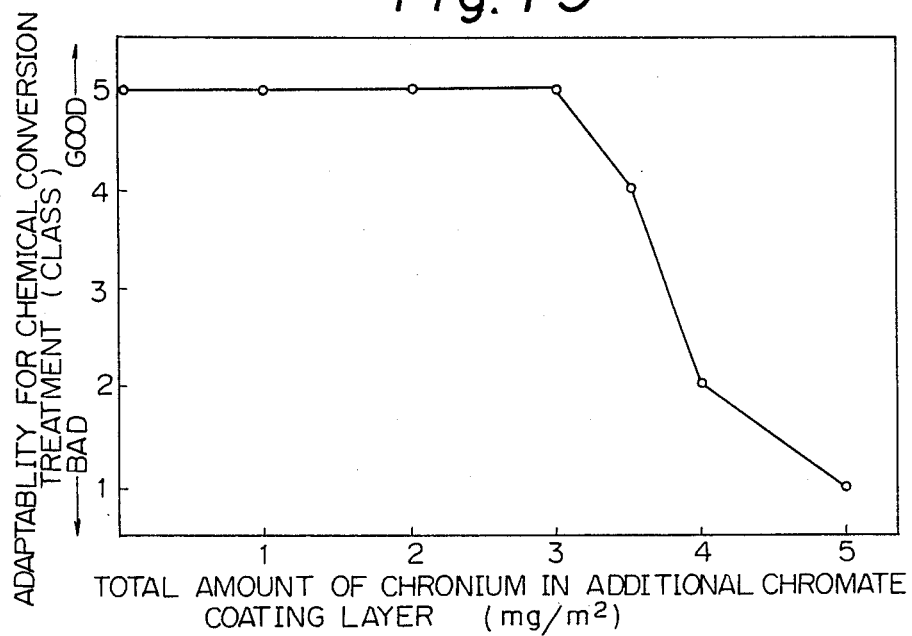
FIG. 19 is a graph showing a relationship between a total content of chromium in a chromate coating layer of a composite steel strip and an adaptability thereof to a chemical conversion treatment.

Referring to FIG. 19, when the total amount of chromium in the additional chromate coating layer is 3 mg/m2 or less, the resultant additional chromate coating layer exhibits an excellent adaptability to the chemical conversion treatment.

This adaptability was tested in such a manner that the additional chromate coating layer surface was treated by a usual phosphate chemical conversion treatment liquid under usual conditions and the ratio of a total area of defective portions of the resultant chemical conversion membrane to the entire area of the resultant chemical conversion membrane was measured. The test results were evaluated into the following five classes.

| Class | Defective area ratio |
| --- | --- |
| 5 | 0 |
| 4 | less than 1% |
| 3 | 1% to 10% |
| 2 | more than 10% but not more than 50% |
| 1 | 50% or more |

SPECIFIC EXAMPLES

The present invention will be further explained in the following examples, which are intended to be representative and do not restrict the scope of the present invention.

In the examples, the following tests were carried out.

A. Flat plate corrosion test

A flat plate specimen was subjected to a salt solution spray test in accordance with JIS Z 2321, and a ratio of a total area of white rusted portions of the surface of the specimen to the entire area of the tested surface of the specimen was determined after a 2000 hour spray test. Also, a ratio of a total area of red rusted portions of the specimen surface to the entire area of the tested specimen surface was determined by the results of a 4000 hour spray test.

B. Corrosion test for deformed portion of specimen

A flat plate specimen was pressed into a cylinder by the apparatus as shown in FIG. 3, and the peripheral surface of the cylinder was subjected to the same salt solution spray test as mentioned above. The white rust test was carried out for 2000 hours and the red rust test was carried out for 4000 hours.

C. Paint adhesion test

This test was carried out in the same manner as described with respect to FIG. 10.

D. Spot weldability test

This test was carried out in the same manner as described with respect to FIG. 14.

E. Friction resistance test

This test was carried out in the same manner as described with respect to FIG. 12.

F. Coating layer adhesion test

This test was carried out by the same method described with respect to FIG. 3.

G. Adaptability of chemical conversion treatment

This adaptability was tested in the same manner as described with respect to FIG. 19.

In the electrolytic chromate treatment liquid used in each of the examples and comparative examples, the contents of $CrO_3$, $Co^{++}$ and $Cl^-$ were controlled in consideration of the aimed content of $Cr_2O_3$ in the resultant chromate coating layer, in the following range.

$CrO_3$: 50 g/l (fixed)
$Co^{++}$: 1 to 4 g/l
$Cl^-$: 0.05 to 0.4 g/l

The temperature of the treating liquid was adjusted to 55° C. and the current density was 5A/$dm^2$. Also, the quantity of electricity applied to the treatment system was controlled in the range of from 3 to 10 Coulomb/$dm^2$ in consideration of the aimed total amount of chromium in the resultant chromium coating layer.

Example 1

Each surface of a steel strip substrate was electroplated with a Zn-Ni alloy having a content of Ni of 11% by weight to form a first metal coating layer having an amount of 20 g/m$^2$; an electrolytic chromate treatment was applied to the first metal coating layer to form a second chromate coating layer having a total amount of chromium of 60 mg/m$^2$ and a content of $Cr_2O_3$ of 90% by weight; and a third resinous coating layer comprising a polymeric matrix consisting of an olefin-acrylic acid copolymer in which the content of olefin (ethylene) was 80 molar % and 20%, based on the weight of the polymeric matrix, of colloidal silica particles having a size of 5 to 7 m μm was formed in a thickness of 1.5 μm and in a amount of 1.5 g/n$^2$ on the second chromate coating layer.

The results of the tests of the resultant composite steel strip are shown in Table 1.

Example 2

Each surface of a steel strip substrate was electroplated with a Zn-Ni-Co alloy having a content of Ni of 11.5% by weight and a content of Co of 0.3% by weight to form a first metal coating layer having an amount of 20 g/m$^2$; an electrolytic chromate treatment was applied to the first metal coating layer to form a second chromate coating layer having a total amount of chromium of 70 mg/m$^2$ and a content of $Cr_2O_3$ of 95% by weight; and a third resinous coating layer comprising a polymeric matrix consisting of an olefin-acrylic acid copolymer in which the content of olefin (ethylene) was 85 molar % and 30%, based on the weight of the polymeric matrix, of colloidal silica particles having a size of 1 to 12 m μm was formed in a thickness of 1.3 μm and in an amount of 1.3 g/m$^2$ on the second chromate coating layer.

The results of the tests of the resultant composite steel strip are shown in Table 1.

p Example 3

Each surface of a steel strip substrate was electroplated with a Zn-Fe alloy having a content of Fe of 60% by weight to form a first metal coating layer having an amount of 20 g/m$^2$; an electrolytic chromate treatment was applied to the first metal coating layer to form a second chromate coating layer having a total amount of chromium of 90 mg/m$^2$ and a content of $Cr_2O_3$ of 75% by weight; and a third resinous coating layer comprising a polymeric matrix consisting of an olefin-acrylic acid copolymer in which the content of olefin (ethylene) was 95 molar % and 35%, based on the weight of the polymeric matrix, of colloidal silica particles having a size of 4 to 5 m μm was formed in a thickness of 1.0 μm and in an amount of 1.0 g/m$^2$ on the second chromate coating layer.

The results of the tests of the resultant composite steel strip are shown in Table 1.

Example 4

Each surface of a steel strip substrate was electroplated with a Zn-Ni-Cr alloy having a content of Ni of 10.8% by weight and a content of Cr of 0.8% by weight to form a first metal coating layer having an amount of 20 g/m$^2$; an electrolytic chromate treatment was applied to the first metal coating layer to form a second chromate coating layer having a total amount of chromium of 70 mg/m$^2$ and a content of $Cr_2O$ of 90% by weight; and a third resinous coating layer comprising a polymeric matrix consisting of an olefin-acrylic acid copolymer in which the content of olefin (ethylene) was 82 molar % and 17%, based on the weight of the polymeric matrix, of colloidal silica particles having an size of 8 to 10 m μm was formed in a thickness of 1.8 μm and in an amount of 1.8 g/m$^2$ on the second chromate coating layer.

The results of the tests of the resultant composite steel strip are shown in Table 1.

Example 5

Each surface of a steel strip substrate was electroplated with a Zn-Mn alloy having a content of Mn of 32% by weight to form a first metal coating layer having an amount of 20 g/m$^2$; an electrolytic chromate treatment was applied to the first metal coating layer to form a second chromate coating layer having a total amount of chromium of 105 mg/m$^2$ and a content of $Cr_2O$ of 95% by weight; and a third resinous coating layer comprising a polymeric matrix consisting of an olefin-acrylic acid copolymer in which the content of olefin (ethylene) was 78 molar % and 25%, based on the weight of the polymeric matrix, of colloidal silica particles having a size of 4 to 6 m μm was formed in a thickness of 2.0 μm and in an amount of 2.0 g/m$^2$ on the second chromate coating layer.

The results of the tests of the resultant composite steel strip are shown in Table 1.

Example 6

Each surface of a steel strip substrate was electroplated with 20 g/m$^2$ of a Zn-Fe alloy having a content of Fe of 32% by weight and then was flash-plated with nickel in an amount of 150 mg/m$^2$ to form a first metal coating layer; an electrolytic chromate treatment was applied to the first metal coating layer to form a second chromate coating layer having a total amount of chromium of 85 mg/m$^2$ and a content of $Cr_2O_3$ of 90% by weight; and a third resinous coating layer comprising a polymeric matrix consisting of an olefin-acrylic acid copolymer in which the content of olefin (ethylene) was 85 molar % and 23%, based on the weight of the polymeric matrix, of colloidal silica particles having a size of 2 to 4 m μm was formed in a thickness of 1.8 μm and in a weight of 1.8 g/m$^2$ on the second chromate coating layer.

The results of the tests of the resultant composite steel strip are shown in Table 1.

Example 7

Each surface of a cold rolled steel strip substrate was flash plated with 150 mg/m$^2$ nickel to form a first metal coating layer; an electrolytic chromate treatment was applied to the first metal coating layer to form a second chromate coating layer having a total amount of chromium of 80 mg/m$^2$ and a content of $Cr_2O_3$ of 98% by weight; and a third resinous coating layer comprising a polymeric matrix consisting of an olefin-acrylic acid copolymer in which the content of olefin (ethylene) was 93 molar % and 30%, based on the weight of the polymeric matrix, of colloidal silica particles having a size of 1 to 2 m μm was formed in a thickness of 1.9 μm on the second chromate coating layer.

The results of the tests of the resultant composite steel strip are shown in Table 1.

Example 8

Each surface of a steel strip substrate was electroplated with a Zn-Ni alloy having a content of Ni of 11.2% by weight to form a first metal coating layer having an amount of 20 g/m$^2$; on one surface side of the substrate, an electrolytic chromate treatment was applied to the first metal coating layer to form a second chromate coating layer having a total amount of chromium of 80 mg/m$^2$ and a content of Cr$_2$O$_3$ of 90% by weight; and a third resinous coating layer comprising a polymeric matrix consisting of an olefin-acrylic acid copolymer in which the content of olefin (ethylene) was 85 molar % and 20%, based on the weight of the polymeric matrix, of colloidal silica particles having a size of 4 to 6 m μm was formed in a thickness of 1.5 μm and in a weight of 1.5 g/m$^2$ on the second chromate coating layer.

The first metal coating layer was not coated on the other surface side of the substrate.

The results of the tests of the resultant composite steel strip are shown in Table 1.

Example 9

Each surface of a steel strip substrate was electroplated with a Zn-Ni alloy having a content of Ni of 11.2% by weight to form a first metal coating layer having an amount of 20 g/m$^2$; on one surface side of the substrate, an electrolytic chromate treatment was applied to the first metal coating layer to form a second chromate coating layer having a total amount of chromium of 75 mg/m$^2$ and a content of Cr$_2$O$_3$ of 90% by weight; and a third resinous coating layer comprising a polymeric matrix consisting of an olefin-acrylic acid copolymer in which the content of olefin (ethylene) was 81 molar % and 23%, based on the weight of the polymeric matrix, of colloidal silica particles having a size of 3 to 5 m μm was formed in a thickness of 1.4 μm and in a weight of 1.4 g/m$^2$ on the second chromate coating layer.

On the other surface side of the substrate, the first metal coating layer was coated with an electrolytically deposited chromium layer having an total amount of chromium of 1.5 mg/m$^2$.

The result of the tests of the resultant composite steel strip are shown in Table 1.

Example 10

Each surface of a steel strip substrate was electroplated with a Zn-Ni alloy having a content of Ni of 12% by weight to form a first metal coating layer having an amount of 20 g/m$^2$; an electrolytic chromate treatment was applied to the first metal coating layer to form a second chromate coating layer having a total amount of chromium of 85 mg/m$^2$ and a content of Cr$_2$O$_3$ of 80% by weight; and a third resinous coating layer comprising a polymeric matrix consisting of a polyacrylic acid and 20%, based on the weight of the polymeric matrix, of colloidal silica particles having a size of 5 to 7 m μm was formed in a thickness of 1.5 μm and in an amount of 1.5 g/m$^2$ on the second chromate coating layer.

The results of the tests of the resultant composite steel strip are shown in Table 1.

Example 11

Each surface of a steel strip substrate was electroplated with a Zn-Ni alloy having a content of Ni of 11.5% by weight to form a first metal coating layer having an amount of 20 g/m$^2$; an electrolytic chromate treatment was applied to the first metal coating layer to form a second chromate coating layer having a total amount of chromium of 80 mg/m$^2$ and a content of Cr$_2$O$_3$ of 75% by weight, and a third resinous coating layer comprising a polymeric matrix consisting of a polyaminoacrylic acid, and 30%, based on the weight of the polymeric matrix, of colloidal silica particles having a size of 4 to 6 m μm was formed in a thickness of 2.5 μm and in a weight of 2.5 g/m$^2$ on the second chromate coating layer.

The results of the tests of the resultant composite steel strip are shown in Table 1.

Example 12

Each surface of a steel strip substrate was electroplated with a Zn-Ni-Co alloy having a content of Ni of 10.5% by weight and a content of Co of 0.5% by weight to form a first metal coating layer having an amount of 20 g/m$^2$; an electrolytic chromate treatment was applied to the first metal coating layer to form a second chromate coating layer having a total amount of chromium of 65 mg/m$^2$ and a content of Cr$_2$O$_3$ of 60% by weight; and a third resinous coating layer comprising a polymeric matrix consisting of n-octylacrylate and 35%, based on the weight of the polymeric matrix, of colloidal silica particles having a size of 8 to 10 m μm was formed in a thickness of 2.9 μm and in a weight of 2.9 g/m$^2$ on the second chromate coating layer.

The results of the tests of the resultant composite steel strip are shown in Table 1.

Example 13

Each surface of a steel strip substrate was electroplated with a Zn-Mn alloy having a content of Mn of 28% by weight to form a first metal coating layer having an amount of 20 g/m$^2$; an electrolytic chromate treatment was applied to the first metal coating layer to form a second chromate coating layer having a total amount of chromium of 75 mg/m$^2$ and a content of Cr$_2$O$_3$ of 50% by weight; and a third resinous coating layer comprising a polymeric matrix consisting of a acrylic acid-vinyl acetate copolymer in which the content of the acrylic acid component was 50 molar %, and 20%, based on the weight of the polymeric matrix, of colloidal silica particles having a size of 10 to 12 m μm was formed in a thickness of 0.8 μm and in a weight of 0.8 g/m$^2$ on the second chromate coating layer.

The results of the tests of the resultant composite steel strip are shown in Table 1.

Example 14

Each surface of a steel strip substrate was electroplated with a Zn-Ni-Cr alloy having a content of Ni of 10.5% by weight and a content of Cr of 1.0% by weight to form a first metal coating layer having an amount of 20 g/m$^2$; and electrolytic chromate treatment was applied to the first metal coating layer to form a second chromate coating layer having a total amount of chromium of 45 mg/m$^2$ and a content of Cr$_2$O$_3$ of 47% by weight; and a third resinous coating layer comprising a polymeric matrix consisting of a polymethacrylic acid and 18%, based on the weight of polymeric matrix, of colloidal silica particles having a size of 1 to 2 m μm was formed in a thickness of 1.2 μm and in a weight of 1.2 g/m$^2$ on the second chromate coating layer.

The results of the tests of the resultant composite steel strip are shown in Table 1.

Example 15

Each surface of a steel strip substrate was electroplated with a Zn-Fe alloy having a content of Fe of 80% by weight to form a first metal coating layer having an amount of 20 g/m$^2$; an electrolytic chromate treatment was applied to the first metal coating layer to form a second chromate coating layer having a total amount of chromium of 95 mg/m$^2$ and a content of $Cr_2O_3$ of 55% by weight; and a third resinous coating layer comprising a polymeric matrix consisting of a methacrylic acid-vinyl acetate copolymer in which the content of the vinyl acetate component was 50 molar %, and 25%, based on the weight of the polymeric matrix, of colloidal silica particles having a size of 3 to 5 m $\mu$m was formed in a t 30 thickness of 1.5 $\mu$m and in a weight of 1.5 g/m$^2$ on the second chromate coating layer.

The results of the tests of the resultant composite steel strip are shown in Table 1.

Example 16

Each surface of a steel strip substrate was electroplated with a Zn-Ni-Co alloy having a content of Ni of 11% by weight and a content of Co of 0.8% by weight to form a first metal coating layer having an amount of 20 g/m$^2$; an electrolytic chromate treatment was applied to the first metal coating layer to form a second chromate coating layer having a total amount of chromium of 110 mg/m$^2$ and a content of $Cr_2O_3$ of 80% by weight; and a third resinous coating layer comprising a polymeric matrix consisting of a poly n-octyl methacrylate, and 25%, based on the weight of the polymeric matrix, of colloidal silica particles having a size of 8 to 10 m $\mu$m was formed in a thickness of 1.8 $\mu$m and in an amount of 1.8 g/m$^2$ on the second chromate coating layer.

The results of the tests of the resultant composite steel strip are shown in Table 1.

Example 17

Each surface of a steel strip substrate was electroplated with a Zn-Ni alloy having a content of Ni of 12.3% by weight to form a first metal coating layer having an amount of 20 g/m$^2$; an electrolytic chromate treatment was applied to the first metal coating layer to form a second chromate coating layer having a total amount of chromium of 105 mg/m$^2$ and a content of $Cr_2O_3$ of 75% by weight; and a third resinous coating layer comprising a polymeric matrix consisting of a poly-isobutyl methacrylate and 20%, based on the weight of the polymeric matrix, of colloidal silica particles having a size of 5 to 7 m $\mu$m was formed in a thickness of 1.5 $\mu$m and in a weight of 1.5 g/m$^2$ on the second chromate coating layer.

The results of the tests of the resultant composite steel strip are shown in Table 1.

Comparative Example 1

The same steel strip substrate as that described in Example 1 was electroplated with 20 g/m$^2$ of a Zn-Ni alloy containing 11.0% by weight of nickel, and the plated steel strip was subjected to the above-mentioned test. The results are shown in Table 1.

Comparative Example 2

The same steel strip substrate as that described in Example 1 was electroplated with 20 g/m$^2$ of a Zn-Ni alloy containing 11.5% by weight of Ni and then treated with a coating type chromate treating liquid to form a chromate coating layer having a total amount of chromate of 70 mg/$^2$, and the resultant coated steel strip was subjected to the above-mentioned tests.

The results are shown in Table 1.

Comparative Example 3

The same steel strip substrate as that mentioned in Example 1 was electroplated with 20 g/m$^2$ of a Zn-Ni alloy containing 10.9% by weight of Ni, was treated with a reaction type chromate treating liquid to form a chromate coating layer having a total amount of chromium of 50 mg/m$^2$ and was then coated with a conventional polyurethane resin to form a resinous coating layer having a weight of 1.3 g/m$^2$ and a thickness of 1.3 $\mu$m, and the resultant coated steel strip was tested as mentioned above.

The results are shown in Table 1.

Comparative Example 4

The same steel strip substrate as that described in Example 1 was electroplated with a Zn-Ni alloy having a content of Ni of 11.2% by weight to form a metal coating layer having an amount of 20 g/m$^2$; a coating type chromate treatment was applied to the metal coating layer to form a chromate coating layer having a total amount of chromium of 90 mg/m$^2$; and a resinous coating layer comprising a polymeric matrix consisting of an acrylic resin and 20%, based on the weight of the polymeric matrix, of colloidal silica particles having a size of 17 to 20 m $\mu$m was formed in a thickness of 1.2 $\mu$m and in an amount of 1.2 g/m$^2$ on the second chromate coating layer.

The results of the tests of the resultant comparative composite steel strip are shown in Table 1.

Comparative Example 5

Each surface of the same steel strip substrate as mentioned in Example 1 was electroplated with a Zn-Ni alloy having a content of Ni of 11.3% by weight to form a metal coating layer having an amount of 20 g/m$^2$; on one surface side of the substrate, a coating type chromate treatment was applied to the metal coating layer to form a chromate coating layer having a total amount of chromium of 95 mg/m$^2$; and a resinous coating layer comprising a polymeric matrix consisting of a polyurethane resin and 20%, based on the weight of the polymeric matrix, of colloidal silica particles having a size of 17 to 20 m $\mu$m was formed in a thickness of 1.3 $\mu$m and in an amount of 1.3 g/m$^2$ on the second chromate coating layer.

On the other surface side of the substrate, the metal coating layer was coated with a chromate coating layer having a total amount of chromium of 4.5 mg/m$^2$.

The results of the tests of the resultant composite steel strip are shown in Table 1.

TABLE 1

| Item | | Example No. | | | | | | | | | | | | | | | | | Comparative Example | | | | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 1 | 2 | 3 | 4 | 5 |
| Flat plate corrosion resistant | White rusted area ratio (%) | 0 | 0 | 0 | 0 | 0 | 0 | 0 | 0 | 0 | 0 | 0 | 0 | 0 | 0 | 0 | 0 | 0 | 100 | 100 | 100 | 90 | 90 |
| | Red rusted area ratio (%) | 0 | 0 | 0 | 0 | 0 | 0 | 0 | 0 | 0 | 0 | 0 | 0 | 0 | 0 | 0 | 0 | 0 | 100 | 100 | 100 | 80 | 80 |
| Corrosion resistance of cylinder-pressed specimen | White rusted area ratio (%) | 0 | 0 | 0 | 0 | 0 | 0 | 0 | 0 | 0 | 2 | 3 | 5 | 2 | 4 | 3 | 5 | 2 | 100 | 100 | 100 | 100 | 100 |
| | Red rusted area ratio (%) | 0 | 0 | 0 | 0 | 0 | 0 | 0 | 0 | 0 | 0 | 0 | 0 | 0 | 0 | 0 | 0 | 0 | 100 | 100 | 100 | 100 | 100 |
| Paint Adhesion (class) | | 5 | 5 | 5 | 5 | 5 | 5 | 5 | 5 | 5 | 4-5 | 4-5 | 4-5 | 4-5 | 4-5 | 4-5 | 4-5 | 4-5 | 1 | 4 | 3-4 | 3-4 | 3-4 |
| Spot Weldability (class) | | 5 | 5 | 5 | 5 | 5 | 5 | 5 | 5 | 5 | 5 | 5 | 5 | 5 | 5 | 5 | 5 | 5 | 5 | 5 | 2 | 2-3 | 2-3 |
| Friction resistance (Rf) of cylinder-pressed specimen | | 0.1 | 0.09 | 0.11 | 0.10 | 0.11 | 0.08 | 0.08 | 0.09 | 0.08 | 0.14 | 0.13 | 0.14 | 0.13 | 0.13 | 0.14 | 0.15 | 0.13 | 0.25 | 0.28 | 0.28 | 0.19 | 0.20 |
| Coating layer adhesion | | 5 | 5 | 5 | 5 | 5 | 5 | 5 | 5 | 5 | 5 | 5 | 5 | 5 | 5 | 5 | 5 | 5 | 1 | 1 | 2 | 2-3 | 2-3 |
| Adaptability (class) of phosphate chemical conversion treatment | | — | — | — | — | — | — | — | — | — | — | — | — | — | — | — | — | — | — | — | — | — | — |

In view of Examples 1 to 17 and Comparative Examples 1 to 5, it is clear that the multiple coated composite steel strips of the present invention exhibit not only an excellent corrosion resistance but also a superior paint adhesion and a satisfactory weldability, an excellent lubricity (small friction resistance), and an enhanced adaptability for phosphate chemical conversion treatment. Therefore, the multiple coated composite steel strips of the present invention are useful as corrosion and rust-resistant steel strips for car bodies.

We claim:

1. A multiple coated composite steel strip, comprising:
   (A) a substrate consisting of a steel strip; and
   (b) at least one composite coating layer formed on at least one surface of the steel strip substrate, and comprising;
      (a) a first coating layer formed on the surface of the steel strip substrate and comprising a plated metallic material,
      (b) a second coating layer formed on the first coating layer and comprising an electrolytically deposited chromate material having a total content of chromium of 40 to 120 mg/m$^2$ and a content of $Cr_2O_3$ of 45% by weight of mole; and
      (c) a third coating layer formed in a thickness of 0.5 to 3.0 um on the second coating layer, and comprising a polymeric matrix consisting essentially of at least one copolymer selected from the group consisting of copolymers of 70 to 95 molar % of at least one type of olefin having 2 to 6 carbon atoms with the balance consisting of acrylic acid, and 15% to 40%, based on the weight of the polymeric matrix, of colloidal silica particles having a size of 1 to 12 m μm.

2. The composite steel strip as claimed in claim 1, wherein the first coating layer is in an amount of 3 to 150 g/m$^2$.

3. The composite steel strip as claimed in claim 1, wherein the first coating layer comprises a nickel-containing metal and has a thickness of 0.1 to 30 μm.

4. The composite steel strip as claimed in claim 1, wherein the first coating layer comprises metallic nickel.

5. The composite steel strip as claimed in claim 1, wherein the first coating layer comprises a nickel-containing alloy.

6. The composite steel strip as claimed in claim 5, wherein the nickel-containing alloy is a zinc-nickel alloy.

7. The composite steel strip as claimed in claim 1, wherein the first coating layer comprises an underlayer formed on the steel strip substrate surface and an overlayer formed on the underlayer, either one of the over and under layers comprising a metallic material free from nickel and the other one of the over and under layers comprising a nickel-containing metallic material.

8. The composite steel strip as claimed in claim 1, wherein the composite coating layer is formed on both surfaces of the steel strip substrate.

9. A multiple coated composite steel strip, comprising:
   (A) a substrate consisting of a steel strip;
   (B) a composite coating layer formed on a surface of the steel strip substrate, and comprising;
      (a) a first coating layer formed on the surface of the steel strip substrate and comprising a plated metallic material,
      (b) a second coating layer formed on the first coating layer and comprising an electrolytically deposited chromate material having a total content of chromium of 40 to 120 mg/m$^2$ and a content of $Cr_2O_3$ of 45% by weight or more; and
      (c) a third coating layer formed in a thickness of 0.5 to 3.0 um on the second coating layer, and comprising a polymeric matrix consisting essentially of at least one copolymer selected from the group consisting of copolymers of 70 to 95 molar % of at least one type of olefin having 2 to 6 carbon atoms with the balance consisting of acrylic acid, and 15% to 40%, based on the weight of the polymeric matrix, of colloidal silica particles having a size of 1 to 12 m μm; and
   (C) an additional electrolytically deposited chromate layer formed on the other surface of the steel strip substrate and having a total content of chromium of 6 mg/m$^2$ or less and a content of $Cr_2O_3$ of 45% by weight or more.

10. The composite steel strip as claimed in claim 9, wherein an additional metal plating layer is formed between the other surface of the steel strip substrate and the additional chromate layer, thereon in an amount of 3 to 150 g/m$^2$.

11. The composite steel strip as claimed in claim 10, wherein the additional metal plating layer comprises nickel.

12. The composite steel strip as claimed in claim 10, wherein the additional metal plating layer comprises a nickel alloy.

13. The composite steel strip as claimed in claim 12, wherein the nickel alloy is a nickel-zinc alloy.

14. The composite steel strip as claimed in claim 10, wherein the additional metal plating layer comprises an additional underlayer formed on the other surface of the steel strip substrate and an additional overlayer formed on the additional underlayer, either one of the additional under and over layers comprising a nickel-containing metallic material and the other one of the additional under and over layer comprising a nickel-free metallic material.

* * * * *

UNITED STATES PATENT AND TRADEMARK OFFICE
CERTIFICATE OF CORRECTION

PATENT NO. : 4,891,273

DATED : January 2, 1990

INVENTOR(S) : H. Odashima, et al.

It is certified that error appears in the above-identified patent and that said Letters Patent is hereby corrected as shown below:

Column 1, line 38, change "a" to --an--.

Column 3, line 34, change "strip" to --strips--.

Column 5, line 13, change "an zinc-electroplated" to --a zinc-electroplated--.

Column 6, line 18, change "s" to --is--.

Column 6, line 35, change "or" to --of--.

Column 11, line 6, change "CrO-S04" to --CrO-S0$_4$--.

Column 11, line 23, insert --when-- between "that" and "the".

Column 11, line 60, change "cis-" to --bis---.

Column 14, line 15, change "ad" to --and--.

Column 15, line 52, change "a" to --an--.

Column 15, line 61, change "m2" to --m$_2$--.

Column 16, line 56, change "Cl-" to --Cl$^-$--.

Column 17, line 16, change "a" to --an--.

Column 17, line 40, delete the "p" before --Example 3".

UNITED STATES PATENT AND TRADEMARK OFFICE
CERTIFICATE OF CORRECTION

PATENT NO. : 4,891,273

DATED : January 2, 1990

INVENTOR(S) : H. Odashima, et al.

It is certified that error appears in the above-identified patent and that said Letters Patent is hereby corrected as shown below:

Column 17, line 68, change "$Cr_2Oof$" to --$Cr_2O_3$ of--.

Column 18, line 5, change "an" to --a--.

Column 18, line 21, change "$Cr_2Oof$" to --$Cr_2O_3$ of--.

Column 19, lines 9 and 10, "chromium of..." on line 10 should continue on line 9 and not start a new paragraph.

Column 19, line 43, change "an" to --a--.

Column 20, line 1, delete "25" and "having" should continue on in Column 19, line 68, and not start a new paragraph.

Column 20, line 42, change "of a" to --of an--.

Column 20, lines 47 and 48, "thickness" in line 48, should continue on line 47 and not start a new paragraph.

Column 20, lines 61 and 62, "of 45" in line 62 should continue on line 61 and not start a new paragraph.

UNITED STATES PATENT AND TRADEMARK OFFICE
CERTIFICATE OF CORRECTION

PATENT NO. : 4,891,273
DATED : January 2, 1990
INVENTOR(S) : H. Odashima, et al.

It is certified that error appears in the above-identified patent and that said Letters Patent is hereby corrected as shown below:

Column 21, line 18, delete "t 30".

Column 21, line 50, "amount" should continue on after "total" on line 49, and not start a new paragraph.

Column 22, line 10, change "mg/$^2$" to --mg/m$^2$--.

Column 25, line 15, change "(b)" to --(B)--.

Column 25, line 25, change "of mole" to --or more--.

Column 26, line 54, change "layer" to --layers--.

Signed and Sealed this

Eighteenth Day of June, 1991

*Attest:*

HARRY F. MANBECK, JR.

*Attesting Officer*      *Commissioner of Patents and Trademarks*